United States Patent [19]

Braun et al.

[11] 4,321,672

[45] Mar. 23, 1982

[54] FINANCIAL DATA PROCESSING SYSTEM

[76] Inventors: Edward L. Braun, 4169 Via Marinia, #412, Marina del Rey, Calif. 90291; Eric A. Thomson, No. 7 Harrisburg, Irvine, Calif. 92714

[21] Appl. No.: 97,400

[22] Filed: Nov. 26, 1979

[51] Int. Cl.³ .......................................... G06F 15/30
[52] U.S. Cl. .................. 364/408; 235/379; 364/200; 364/900
[58] Field of Search ............... 364/200, 408, 900; 235/379, 383

[56] References Cited

U.S. PATENT DOCUMENTS

| | | | |
|---|---|---|---|
| 3,277,444 | 10/1966 | Masters | 364/200 |
| 3,375,500 | 3/1968 | Fowler et al. | 364/900 |
| 3,959,773 | 5/1976 | Hyman | 364/200 |
| 3,970,992 | 7/1976 | Boothroyd et al. | 364/900 |
| 4,025,905 | 5/1977 | Gorgens | 364/900 |
| 4,166,945 | 9/1979 | Inoyama et al. | 235/379 |

*Primary Examiner*—Jerry Smith
*Attorney, Agent, or Firm*—Fraser and Bogucki

[57] ABSTRACT

Methods and systems for effecting a variety of electronic funds transfer transactions are based upon the use of unit records containing preprinted non-machine readable data, preprinted machine readable data, and manually entered data, and conversion of such records from negotiable instruments to documentary evidence of the satisfactory completion of the transaction. By first automatically reading the encoded data on the unit record and incorporating transaction data and security information in messages transmitted from a terminal, a financial institution can verify the validity of the transaction, effect the transaction and return an authorization message containing both reference and transaction information for imprinting on the unit record. The record then evidences the satisfactory completion of the transaction, and no further document generation or handling are needed at the merchant and financial institutions involved. The record is capable of usage as a conventional negotiable instrument if terminal facilities are inoperable or not available.

82 Claims, 9 Drawing Figures

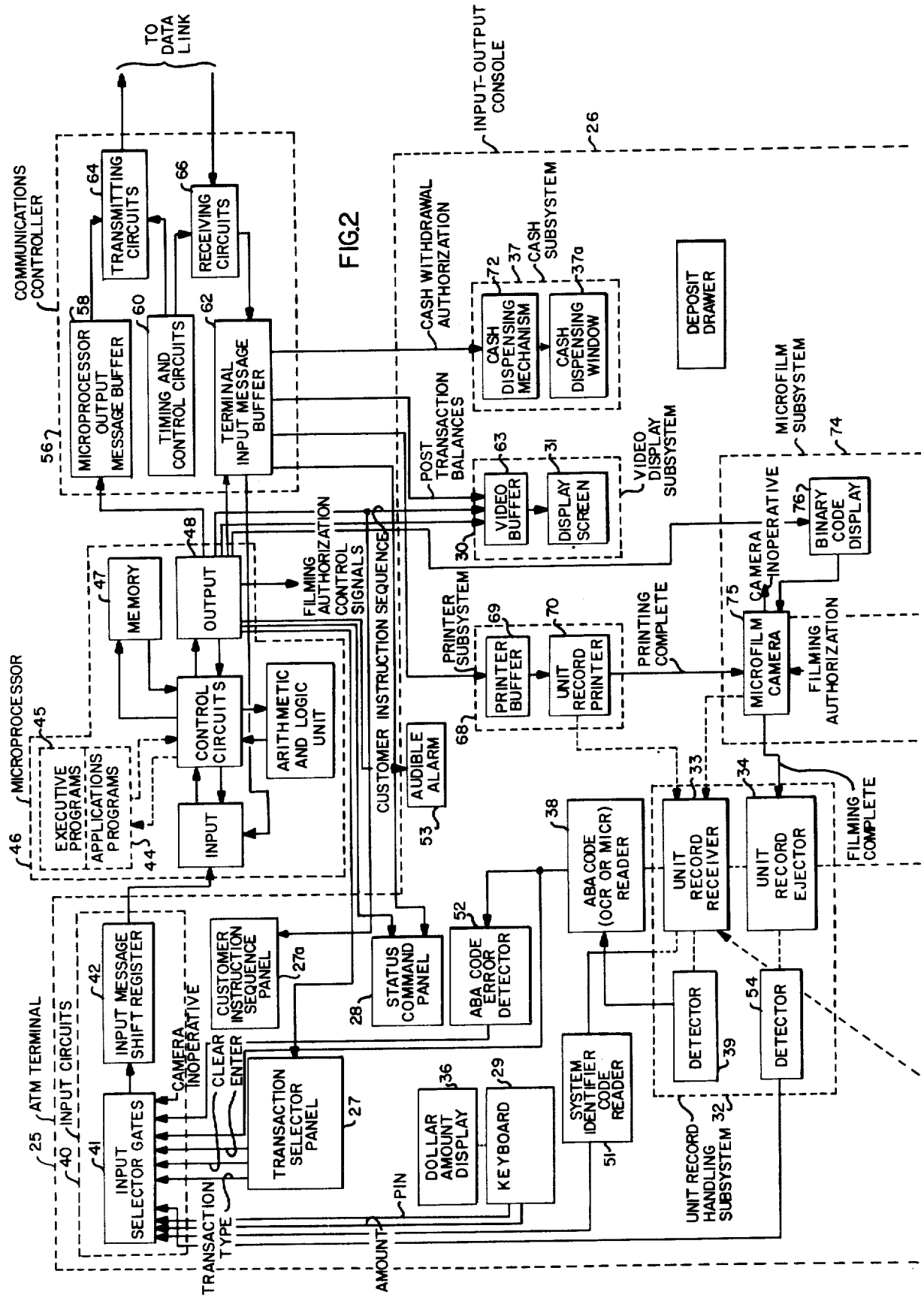

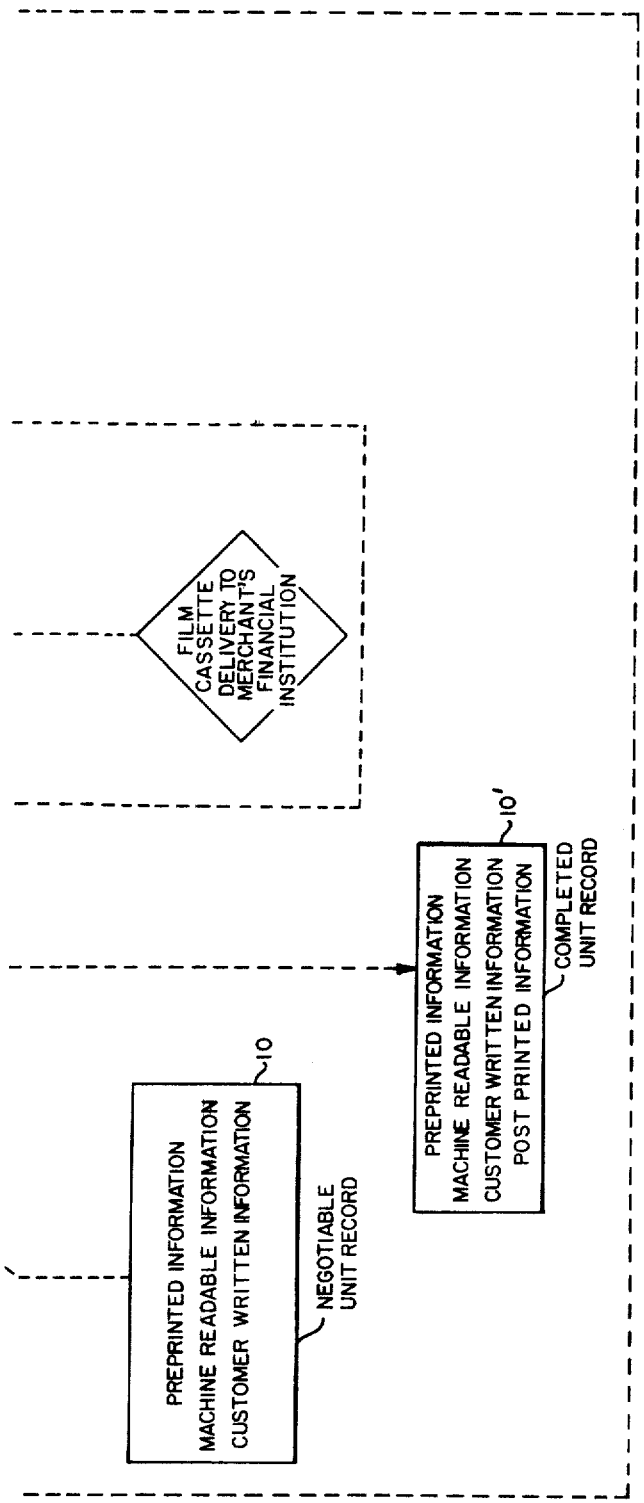

FINANCIAL DATA PROCESSING SYSTEM

BACKGROUND OF THE INVENTION

This invention relates to financial data processing systems and, more particularly, to such a system which utilizes negotiable instruments such as bank checks as the primary documents for accomplishing the automatic transfer of funds.

Historically, the transfer of funds has been accomplished in a number of ways. The most direct, of course, is the transfer of specie or currency from one party to another. Not quite as direct in its use, but very widely used, is the system of checking accounts by which a person directs his bank or other financial institution to make payment to the person named on the check or to his order. Checking accounts allow one to carry a single form of document which may be filled in with any amount and negate the necessity of carrying large amounts of cash. Checks may only be cashed by the payee or to his order and thus are more secure than cash. The rights and duties of the parties to a checking transaction have been clearly established by the courts. Checks are almost universally accepted where the identity of the maker can be verified or sufficient time allotted for funds transfer. For all of these and other reasons, checks have proven essential to both households and businesses; and people have become wedded to the system.

Checking systems do have disadvantages, however. For example, checks are often forged, drawn on accounts with insufficient funds, and lost. More importantly, the present system of check processing through a banking system requires a great number of labor intensive steps for check writers, check receivers and check processors (financial institutions). For example, a check is written, exchanged, endorsed, deposited at a financial institution, and then handled many different times before it is returned to its maker along with a monthly statement. Many of these processing steps require the creation of additional documents and represent a substantial amount of labor. The usual practice involves three different microfilm steps, several different balancing operations, and various other steps such as proving, encoding, capturing and sorting. Consequently, the processing of checks is quite expensive and time consuming.

Checking processing costs, of course, extend not only to the financial institutions, but also to the payor and payee who must each perform record keeping tasks in the course of their check handling. However, because financial institutions absorb the highest portion of check processing costs, they have been experimenting with the feasibility of alternative forms of funds transfer which are more efficient. The use of a plastic credit card has evolved as an alternative for checks written at retailer locations. In the usual case, credit cards do provide a substantial surety that funds exist to cover the amount of the transaction. However, they are also subject to theft and fraud. While the processing of credit card transactions is quite automated the relative volume of transactions, as compared to check transactions, results in credit cards being an expensive form of funds transfer as well. U.S. Pat. No. 3,594,727, issued July 20, 1971, to a co-inventor of the present invention, discloses a system for automating the use of credit cards to obviate the processing problems and the expense involved therewith. Even such advanced systems for handling credit cards will not eliminate the need for a more efficient check processing system, due to the public's reliance upon checks as a preferred form of funds transfer.

The principle underlying automated forms of funds transfer is that the information normally written on checks is converted into machine readable form to gain the efficiency and control inherent in the use of computers. The technology and procedures needed to support this form of automated funds transfer are gradually being refined by the financial industry. However, the credit card not only requires a change in customer habits, but cannot be used in many situations, as in transactions involving personal dealings. A system which will automate the processing of checks, thereby reducing the time, the labor, the documents used, and the expense of such processing, is obviously desirable. Moreover, such an automatic check processing system would be even more desirable if it could be made to provide substantial security for the parties involved and eliminate other problems inherent in the present system. While it is known in the prior art to verify the existence of an account by reading encoded information on a check, this function is only equivalent to usage of a credit card and cannot suffice as the basis for a complete financial transaction.

SUMMARY OF THE INVENTION

The foregoing and other problems of the prior art are solved by the system of this invention which utilizes a number of unique peripheral data processing terminals which cooperate with the central data processing equipment of a financial institution to automatically process the details of a transaction. The system utilizes, as its primary and basic document, a unit record which can alternatively serve as a traditional bank check in a conventional purchase-payment transaction. In this system, however, the unit record functions as a machine readable access device to activate a system configured to automatically identify customers, determine account balances and the propriety of the transaction, transfer funds between accounts, transfer funds from payor to payee, issue funds, and accomplish various other financial transactions. All such steps are carried out without the generation of duplicate document copies or manual handling of documents. In addition, data imprinted on the unit record by the terminals of this system in conjunction with the system's logic and storage elements, software, security controls and procedures enables each of the parties involved to reference data and locate source documents pertaining to completed transactions. The system and method involved effectively convert the unit record from the status of a negotiable instrument to a document in evidence of a completed transfer of funds. The completed document is retained as evidence of the correctly completed transaction and can be used in the same way as the traditionally written bank checks to verify the status of the account on a periodic basis.

In accordance with the invention a unit record placed in a terminal activates the system. The operator, usually a customer, then provides an identification number which can be examined for security purposes; punches in a transaction which actuates the central data processing equipment to execute the operation; and receives back the unit record which has been cancelled, photographed, and imprinted with the description of the automated financial operation which has taken place in the financial institution's central processing files. The customer may simply write the unit record as a conventional negotiable bank check where check recipients do not have access to the system or terminals are not operative. All transactions are readily integrated by the bank in rendering periodic statements. The customer can also benefit from having an immediate knowledge of his account status, while being assured, through usage of signature, personal identification number and account code number, of a high level of security against unauthorized access to his account. The merchant or other check recipient benefits not only from decreased processing costs as compared with the use of conventional checks but also enjoys assurance of immediate payment on these system transactions.

The system and method of this invention allow immediate funds transfer, provide a parallel documented audit trail and retrieval mechanism, eliminate most of the manual effort and expense required in present-day check processing, reduce exposure to fraud and check overdrafts, and substantially reduce the cost of banking operations. In addition, the system ties in directly to existing central switching and processing systems for effecting inter-bank transfers, and is designed for use with an automated teller system terminal within a financial institution, automated teller machines and point of sale terminals.

A feature of the invention is the generation of an authorization message at the financial institution, which message contains a reference number that can be imprinted on the check and utilized for information retrieval purposes. Another feature resides in the assembly at the terminal of customer or operator entered information, machine read information and predetermined information so that the essentials of the transaction can be transmitted efficiently to the financial institution, without complex input procedures. For this purpose the unit record advantageously is arranged to include a number of fields of different character, such as machine readable codes identifying account numbers and the financial institution, manual entries such as customer signature and dollar amount of the transaction, visual identifiers such as customer and bank data, and imprintable fields for receiving the reference number and confirming financial data. The unit record may also include special machine readable identifier codes that enable immediate disqualification of documents that are not suitable for the system, or that have previously been cancelled or invalidated.

In accordance with other aspects of the invention, the terminal is arranged to instruct the customer or operator in the sequence of entries and operations. From entry of the unit record through rejection of improper or defective records, through the entry of transaction amount and type data to final imprinting of reference data and evidence of the completed transaction, the steps are simplified and minimized to meet the particular circumstances. Errors can be detected and corrected and audio alarms can be utilized to insure that the transaction is correctly completed.

Through other aspects of the invention the same system enables the incorporation of many options, such as the usage of multiple accounts, the logging and tallying of information for a merchant, the supplying of additional information as to account and credit status, and cooperation with a central switching and processing center for interaction with other financial institutions.

BRIEF DESCRIPTION OF THE DRAWINGS

Other features and advantages of the invention will become apparent from the following specification which should be read in conjunction with the drawings in which like reference numerals refer to like elements in the several figures.

FIG. 2 is a block diagram of an automated teller machine terminal constructed in accordance with the invention, comprising two sheets designated FIG. 2 and FIG. 2A that are to be placed in adjacent relationship;

DETAILED DESCRIPTION OF THE INVENTION

Figure 1:
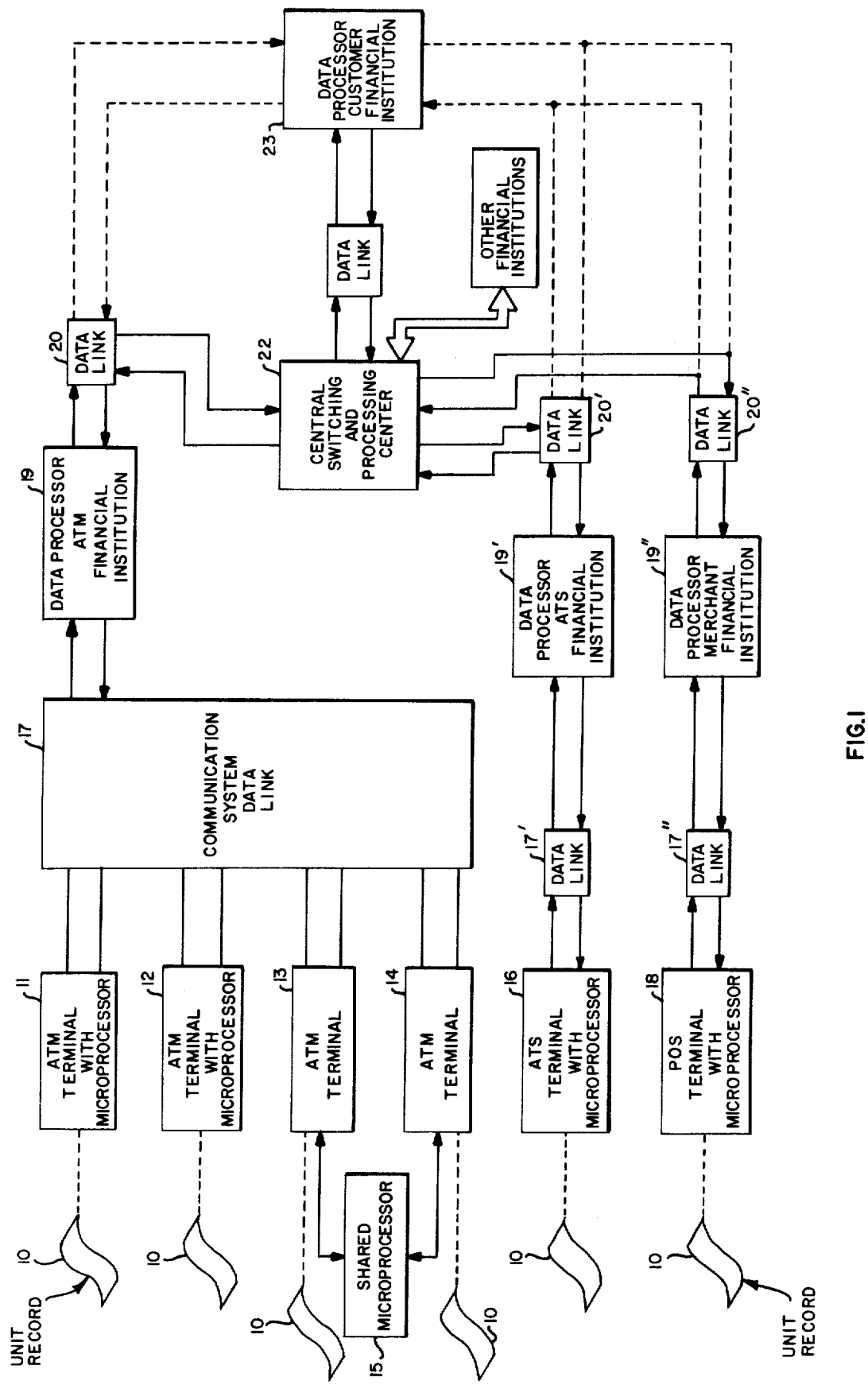
FIG. 1 is a block diagram of an automatic unit record processing system constructed in accordance with the invention.

Referring now to the drawings and, more particularly, to FIG. 1, there is shown a financial data processing system constructed in accordance with the invention for utilizing and transforming unit records 10 in a variety of electronic funds transfer transactions. The system includes, by way of illustration, a pair of terminals 11, 12 each having an internal microprocessor, input-output console and communications controller and a second pair of terminals 13, 14 cooperating with a shared microprocessor 15. This arrangement illustrates that there may be a substantial number of terminals and that they may be stand alone units or that one or more may be shared with a given processor. Further, although microprocessors are convenient and inexpensive, the data processing function can be carried out by larger or special purpose systems.

The terminals 11-14 cooperate, through a data link 17, with the data processing center or processor 19 of the financial institution which maintains the terminals 11-14. This data processor 19 is normally a large scale general purpose computer with various peripheral equipment. Although other well known systems may be used, a typical data link or communication system 17 utilizes the telephone lines and includes connective, timing, and control circuits for gaining access to and transmitting digital information by telephone. The use of such a system is discussed in U.S. Pat. No. 3,594,727, mentioned above.

FIG. 1 also illustrates that the data processor 19 for the merchant's financial institution may be intercoupled to a number of central data processing units of other financial institutions via another data link 20 which may be connected into a central switching and processing center 22 and alternatively directly to the data processor 23 at the customer's financial institution. Central switching and processing centers are now in use and enable cooperation between any individual financial institution and any other that is coupled to the same center. Such an arrangement is contemplated by the present invention but is not necessary thereto.

The terminals 11-14 shown in FIG. 1 may be few or many and may be any of a number of different types. However, automated teller machine (hereafter usually ATM) terminals which may be used by a financial institution in place of a live teller, have been chosen by way of example for the primary description of the system. The same overall system may further incorporate one or more automated teller system (ATS) terminals 16 which may be used by a customer assisted by a live teller, and one or more point-of-sale (POS) terminals 18 which may be placed on a merchant's premises. Each of these terminals 16, 18 may communicate with the central switching and processing center 22 via its own associated data processor 19' or 19" respectively (and via appropriate data links). Such terminals, which may be arranged and utilized as discussed in more detail hereinafter, are considered to be most useful, because they all cooperate with unique unit records in accordance with the invention. However the system concept and the unit records are amenable to use with other terminals performing simplified or specialized functions, as will be evident to those skilled in the art. Although the different peripheral terminals 11-14, 16, 18 operate on similar principles as far as communications with the data processors 19, 19', 19" and the data link 17 are concerned, they differ as to the extent and variety of functions for which they may be used. As described in greater detail in conjunction with FIG. 2 below, the terminals 11-14 are microprocessor controlled, in order to provide flexible and real time interaction between the user, the different subsystems of the terminal itself and the central system and remote units with which the terminal cooperates. As is also described below, however, electronic funds transfer is effected in each case utilizing the initially negotiable unit record 10 and transforming it into a completed record that evidences the transaction adequately for all concerned.

Structure of an ATM Terminal

In FIG. 2 there is illustrated a block diagram of an automatic teller machine (ATM) terminal 25 for communication with financial institutions in systems constructed in accordance with and based upon the invention. Such an ATM terminal might be placed in the lobby of a financial institution (including a commercial bank, savings and loan, credit union or other financial institution), through the wall of a financial institution or in a remote facility for operation by a customer of the financial institution. The ATM terminal 25 shown in FIG. 2 has an input-output console 26 which includes a number of elements visible in whole or in part to the user, namely a transaction selector panel 27, a customer instruction sequence panel 27a, a status command panel 28, a keyboard 29, a video display subsystem 30, including a display screen 31 (which can also be used for customer instruction sequencing instead of panel 27a), a unit record handling subsystem 32 including a unit record receiver 33 having an entry tray and a unit record ejector 34 including an ejection slot (not shown in FIG. 2). The input-output console 26 also has a visible dollar amount display 36 associated with the keyboard 29, and a cash subsystem 37 including a cash dispensing window 37a. The console 26 is used by an account holder for entering details as to amounts and the nature of financial transactions to be executed by the system. Other operative units associated with the console 26 are described hereafter.

Figure 4:
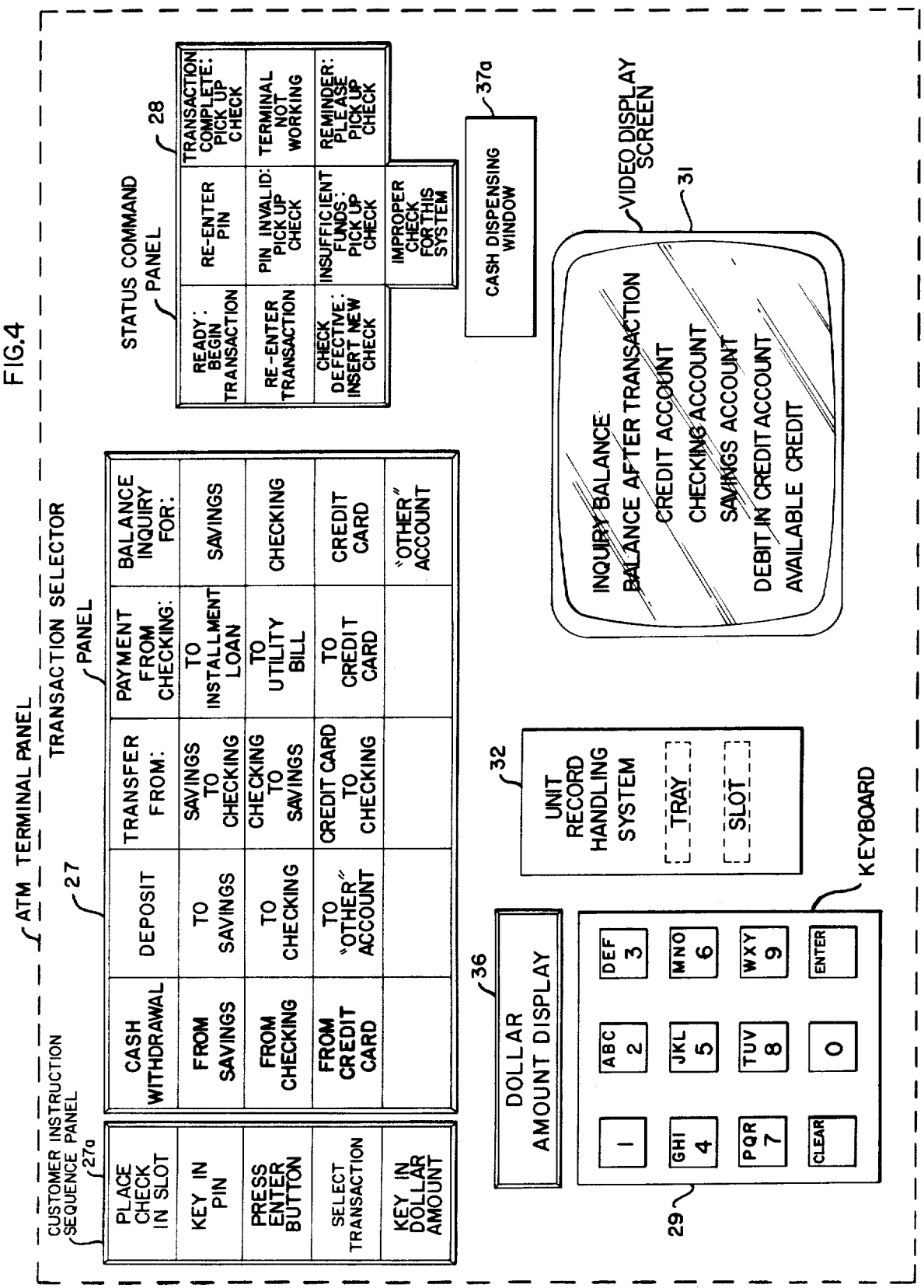
FIG. 4 is a diagram of a control and display panel used in the automated teller machine system of FIG. 2.

The console 26 panel is shown in greater detail in FIG. 4, to which reference may now be made. It includes the transaction selector panel 27 which has mounted thereon a number of indicator buttons which are depressed to initiate different transactions. The buttons are marked to indicate the particular transaction and light when depressed. The customer instruction sequence panel 27a consists of several (five, in this example) instruction display elements with means provided for illuminating each element. The microprocessor 46, (FIG. 2), guides the customer through the steps of the transaction by causing the appropriate instruction to be illuminated. A "clear" button on the keyboard 29 enables the sequence to be restarted. The first column of the transaction selector panel 27 contains buttons which initiate a cash withdrawal and select the accounts from which a withdrawal is to be made while conversely the second column contains buttons which initiate a deposit and select the accounts to which a deposit is to be made. The third column buttons control the transfer of funds from various accounts to other accounts. In the fourth column, the buttons allow a payment of funds from a checking account to various payees while the fifth column buttons enable the customer to select the display of the balance in various accounts.

The status command panel 28 mounts a number of indicators which light to tell the operator the status of the transaction or the system and/or signal to him the next action he must undertake. The various states indicated include the problems and errors that are likely to arise, and are more conveniently described in detail in conjunction with the operating example given below. However, error and problem conditions may be triggered by signals from the central processor 19 or locally. For example, certain conditions are generated if the account number read from the check and transmitted to the processor does not constitute a valid account. The source of the error could be a counterfeit check, an error in the checking account number reading circuits, or errors in transmission from the ATM terminal 25 to the central processor 19. In this case and in the case of an incorrect PIN being entered, the central processor 19 can be programmed to allow a preset number of unsuccessful attempts to re-enter the transaction during a given period after which the transaction can be rejected.

The keyboard 29, referring now to both FIGS. 2 and 4, is used to key in both the PIN, which will be discussed hereinafter, and the amount of a particular financial transaction. The video display screen 31 is used for indicating a balance in a particular account, for indicating the balance at the end of a particular transaction, and for giving various preselected instructions, particularly where the system is designed to accommodate more than one account of a similar type. The video display screen 31 may in fact be used to present all instructions for operating the ATM terminal 25, thus supplanting the functions of the panels 27 and 28. This alternative approach will be understood to be available for use by those skilled in the art with the choice depending upon factors of cost in both hardware and software, including processor time. The tray portion of the unit record receiver 33 pulls out to accept a negotiable unit record which initiates the operation of the system. The slot for the unit record ejector 34 is used to return the completed unit record 10 once it has been processed by the system. The dollar amount display 36 indicates the dollar amount keyed in by means of the keyboard 29. The cash subsystem 37 and cash dispensing window 37a may be utilized in particular embodiments for the distribution of cash to the account holder.

Referring again to FIG. 2 specifically, the input-output console 26 also includes an ABA code reader 38 which may be of the type selected to read magnetic ink (MICR) or optical (OCR) account indications. The code reader 38 is actuated by a detector 39 which responds to insertion of a negotiable unit record in the tray of the unit record receiver 33, and generates digital signals indicative of the American Banking Association (ABA) magnetic ink code recognition (MICR) encoded account number pre-printed on the unit record. These signals are transferred to input circuits 40 including input selector gates 41, which also receive digital input signals from the keyboard 29 and the transaction selector 27. The signals are generated on depression of the various buttons by well known signal generating means such as switching networks. The input selector gates 41 also receive indications of whether the unit record is valid for use with the terminal and, also, whether it has previously been voided or cancelled, from an identifier code reader 51 which reads the system identifier code field and the invalidating code field on the unit record while in the unit record receiver 33. In addition, signals for the gates 41 are also received from error detector circuits 52 which identify errors in the ABA code from the reader 38, from a detector 54 which is responsive to the presence of a unit record 10 in the exit slot of the unit record rejector 34, and from a "camera inoperative" signal from an associated micro-film camera discussed below.

The input selector gates 41 provide inputs to an input message shift register 42 which is connected to the input circuits of a microprocessor 46. Dollar amount information entered into the input message shift register 42 is displayed by the amount display 36 and may be modified by reentry of data at the ATM terminal panel of FIG. 4.

A microprocessor is a small inexpensive programmable digital computer which may be formed on a single semiconductor chip. Such devices typically but not necessarily include a first section which is a true small digital computer with the various calculating circuits, registers, and other components found in conventional digital computers, and a second section which may be termed a read only memory. In the manufacture of the micro-processor, a program can be, in effect, written permanently into the read only memory by providing suitably masks to create the necessary microcircuitry therein. The microprocessor is then said to be dedicated to the particular task for which the program is written into the memory.

The function of the microprocessor 46 is to assemble the various data presented by the account holder into messages for transmission to a data processor at a financial institution, to control the transmission and reception of messages from the data processor, and to present data back to the account holder. Therefore, the applications programs 44 of the microprocessor 46 include a message format program for assembling the data from the various sources. Other applications programs will be discussed hereafter, but all the functions involved, such as data display, sequencing and output signal generation are presently known in many different forms to those skilled in the art. Executive programs 45 control the internal operations of the terminal 25 in conventional fashion. The executive and applications programs are indicated in FIG. 2 as functional portions of the microprocessor 46 for illustrative purposes only but should be understood to comprise various distributed components connected within the microprocessor 46, or memory controlled software.

The microprocessor 46 receives input signals from the transaction selector 27 via the input selector gates 41 and the input message shift register 42 and transfers digital signals in output message format to an output message shift register, which may form a part of output circuits 48 in the microprocessor 46 itself. Here messages are held until receipt of an "Enter" signal from the keyboard 29. The messages are sent from the output circuits 48 to a microprocessor output message buffer 58 in a communications controller 56. The message signals are amplified and outputted to the data link by transmitting circuits 64, under control of timing and control circuts 60, to the central data processor 19 of the ATM or ATS financial institution.

The communications controller 56 also includes receiving circuits 66 which receive signals from the central data processor 19 under control of the timing and control circuits 60 for routing to an input message buffer 62 feeding the ATM terminal 25. These signals are generated by the ATM or ATS financial institution data processor 19 of FIG. 1 and transmitted to the terminal to operate several functional systems, namely the status command panel 28, the cash subsystem 37, the video display subsystem 30 and a printer subsystem 68. Video buffer circuits 63 in the video display subsystem 30 receive signals as to post transaction balances to display on the screen 31. The printer subsystem 68 includes a printer buffer 69 and a unit record printer 70 positioned to imprint data in selected fields on the unit record when it is in the unit record handling system 32, as is shown and described in greater detail in conjunction with FIG. 7 below. A "printing complete" signal from the unit record printer 70 activates a microfilm subsystem 74 to photograph the unit record via a microfilm camera 75. The camera 75 generates a "filming complete" signal to activate the unit record ejector mechanism 34 which feeds the completed unit record out to the customer from its associated slot. A binary code display 76 controlled by the microprocessor 46 and adjacent the camera 75 generates a unique binary pattern for recording of the referece number on the margin of each microfilm image frame. In the cash subsystem 37 a cash dispensing mechanism 72 controlled by upstream signals from the communications controller 56 provides currency upon command to the window 37a.

It should be noted that various of the circuits of the ATM terminal 25 might be implemented by circuitry within the microprocessor 46. For example, the input selector gates 41, the input message shift register 42, the output buffer 58, the timing and control circuits 60, and the input buffer 62 might each actually be implemented by circuitry within the microprocessor 46. However, for clarity of description, each has been illustrated independently.

In the ATM terminal 25, referring again to FIG. 2, the detector 54 for sensing the presence of a unit record in the output slot for the unit record ejector 34 is typically photoelectric although other conventional types may be used. The terminal 25 also incorporates an audible alarm 53 which may be used to call the customer's attention to an incorrect step or omission on his part, such as for example forgetting to pick up his check or cash, and to thereby direct his attention to the display panels and screen.

Associated Data Processing Systems

Figure 3:
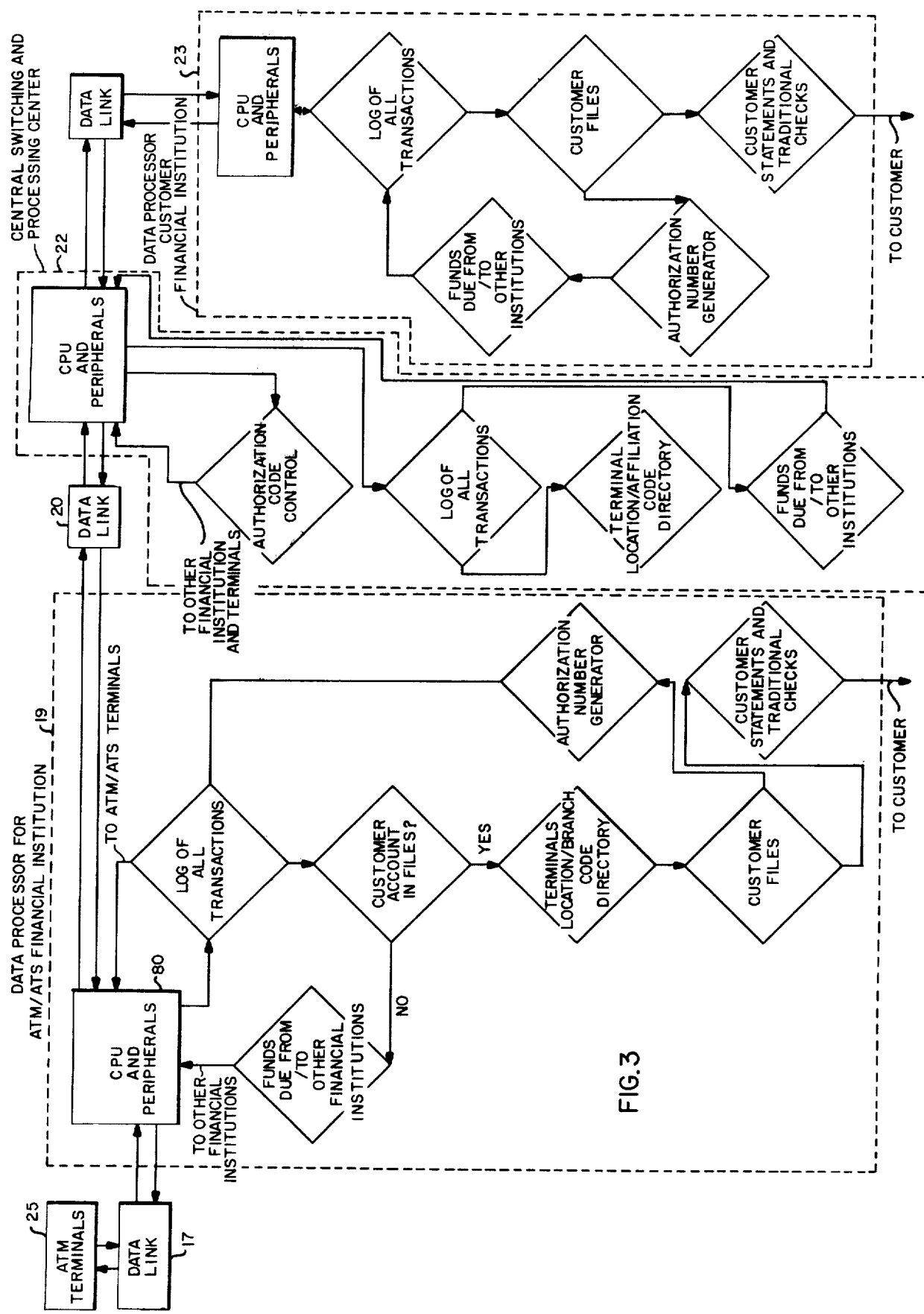
FIG. 3 is a block diagram of a remote central data processing system for cooperating with the system of FIG. 2.

Further details as to the way in which a specific terminal may cooperate with various financial institutions are shown in FIG. 3, in which diamonds represent some of the principal steps in processing data. The principal systems involved, corresponding to FIG. 1, comprise the data processor 19 for the ATM/ATS financial institution, the ATM terminals (ATS terminals cooperate with the system in a similar way as ATM terminals), the Central Switching and Processing Center 22 and the data processor 23 for the customer's financial institution, together with conventional data links 17 and 20. The data processor 19 at the ATM (or ATS) financial institution is shown in general form as comprising a central processor unit (CPU) and associated computer peripherals 80, which may be any large or small system for electronic funds transfer. A number of programming functions are performed in the data processor 19 for transmission of information in both directions in the data network.

A unique terminal identifier code is initially supplied to or later entered in the microprocessor 46, where it is retained in storage. This number is automatically appended to the transmission from the terminal to the data processor 19 to control the routing of response messages back to the proper terminal. The number also provides the key for accessing the terminal location/branch code directory and terminal location/affiliation code directory, FIG. 3 and the terminal location/merchant code directory, FIG. 6, concurrently or later, to enable the customer's financial institution to denote, for the benefit of the customer on his monthly statement, where the transaction took place. All transactions are logged for future reference and processing, and each transaction leads to a determination of whether funds are owing to or due from other financial institutions. This information is forwarded on by the CPU 80 to the downstream central switching and processing center 22 and other financial institution data processors 23. Another determination which is made within the data processor 19 is whether the customer is at the same financial institution. If so, there is no need to go outside the financial institution data processor 19, and the relevant information as to geographical location and branch of the financial institution where the transaction took place is determined by the data processor looking up in a stored directory the location/branch information corresponding to the location/branch codes received from the terminal. The customer files are updated, and subsequently, the customer's statements including the electronic funds transfers effected using the unit record, as well as traditional checks received from other transactions, can be tabulated periodically and forwarded to the customer.

The messages between different locations may be encrypted for security reasons, in all directions of transmission. As shown in flow chart form in FIG. 3, the Central Switching and Processing Center 22 also logs all transactions involving more than one financial institution, and determines funds due to and from various financial institutions. The Center also references a terminal location/affiliation directory to determine geographical location and financial institution identity and branch corresponding to the location/affiliation codes received from the ATM or ATS terminals. This information is needed to intercouple one financial institution with another within the system. In the data processor for a customer's financial institution 23 all transactions are logged, customer statements are prepared and funds due from and to other banks are processed as previously described. In the typical ATM or ATS system the customer account will be at the same institution. Where a different arrangement exists, cross coupling and integration between financial institutions is made feasible by this system.

Authorization Number

The information needed to complete a transaction in process at the terminal is transmitted to the ATM or ATS terminal 25 from the data processor 19 or the data processor 23, in the form of an authorization message which includes an authorization number which serves as a means for protecting the system against fraudulent transactions originating from unauthorized sources. The authorization message and authorization number are transmitted after the tests related to customer identity and funds availability have been made. The authorization number is an algorithmically generated number produced by the customer's financial institution that is verified at the terminal based upon system wide information known only to authorized parties within the system. The authorization number is derived by means of authorization algorithms and operands, or, keys, as described below, that are generated and transmitted periodically (being changed for each interval) by the Central Switching and Processing Center 22 to all terminals of the system. The authorization number is stored within each data processor and is used during the appropriate interval.

At a programmable time each day the Central Switching and Processing Center (CSPC) 22 transmits to each financial institution data processor 19, 23, etc. and to each terminal 11, 13, 16, 18 of the system an authorization algorithm $F_i$ or key for selection of one of a number of stored algorithms and an authorization operand $Y_j$ or key for selection of one of a number of stored authorization operands in order to provide an additional level of security against unauthorized transactions at the terminal. This system works as follows:

At programmable times each day the CSPC selects a stored authorization algorithm and operand and transmits these two data items, or keys to such items stored in the memories of the terminal microprocessors of financial institution data processors, to each terminal and financial institution in the system. The microprocessor associated with each terminal and the financial institution data processors apply the selected algorithm $F_i$ to the selected authorization operand $Y_j$ to produce the authorization number $F_i(Y_j)$, which is stored for a programmable period in their respective memories. Whenever a requested transaction has passed the account number—PIN pair and adequacy of funds verification tests, the customer's financial institution data processor extracts this authorization number from memory and appends it to other data elements it transmits to the terminal as part of the complete authorization message for the purpose of completing the transaction. Before allowing the sequence of steps necessary to complete the transaction the terminal compares the authorization number stored in its memory with that received from the financial institution data processor in order to verify that the authorization number and authorization message did indeed originate at the appropriate financial institution.

In the event that the authorization number received by the terminal from CPU 19 or 23 does not match the authorization number resident in the terminal microprocessor, the message received will be rejected. The microprocessor will have been programmed to produce a message that is forwarded to the customer's financial institution informing it of the message rejection due to inappropriate authorization number. A series of these message interactions can be allowed before the terminal logic in the microprocessor voids the transaction and rejects the unit record, in which case the customer would have to find alternative means of making the financial transaction.

Reference Number

The reference number is used to uniquely identify a transaction so that a copy of the completed unit record of the transaction may be retrieved simply by knowledge of that reference number. The reference number explicitly or implicitly contains or refers to the following items of data relating to a specific transaction: date, time, terminal ID, terminal owner code, and customer ABA account number. For example, the reference number may be a number containing coded representations of these individual data elements positioned one after another so that the individual elements are immediately apparent; or, as one alternative, a coded number may be generated and assigned in which the individual data elements are not immediately apparent. The reference number can be a long string of identifiable segments or can be compressed in accordance with some algorithm to a shorter sequence of alpha-numeric characters or digits. The essential feature regardless of the form of the reference number is that when it is assigned it is printed on the unit record and also copied into the customer's file along with other essential elements of the specific transaction. This reference number then appears on the customer's statement alongside the other details of each transaction. It is used in making an inquiry about a particular transaction and facilitates retrieval of a copy of the appropriate unit record by means described elsewhere in this specification.

Operation of an ATM Terminal

The operation of the ATM terminal 25 (FIG. 2) is such that when a negotiable unit record is placed in the check tray of the unit record handling system 32, the American Banking Association (ABA) MICR encoded account number is read from the negotiable unit record and stored by the microprocessor 46. A PIN, or other available and industry approved means of verifying customer identity, is then entered into the terminal 25 and stored by the microprocessor 46. This stored information in appropriate format is then transmitted by the terminal 25 to the data processor 19. The information may also be transmitted on to another data processor 23, depending on whether the ATM/ATS financial institution and the customer's fiancial institution are the same or different. At the appropriate institution 19 or 23 the information is checked against stored information related to the customer to determine that the account number and PIN entered at the terminal match those stored at the data processor. If they do not match, the terminal 25 will be signaled ultimately that the transaction is rejected. If they do match, the next appropriate button in the customer instruction sequence light panel, namely "Select Transaction" is lighted also in response to a signal from the data processor 19 to show that the terminal 25 is ready to accept the remaining steps of the transaction. At this time, the particular type of transaction is selected by means of the transaction selector 27, and the dollar amount of the transaction is entered via keyboard 29, generating signals which are transferred to the data processor 19. The processor 19 utilizes the signals to execute the particular transaction automatically in the designated accounts within its electronic files. The data processor 19 records the transaction in the customer memory files and transmits back to the terminal 25 signals indicating the details of the transaction. The signals cause the details of the completed transaction to be imprinted by the printer 70 upon the unit record 10, as evidence of the completed transaction and of the cancellation of the negotiable unit record. They also cause a photograph of the completed unit record to be taken on microfilm by the camera 75 together with indexing data from the binary code display 76 that is also recorded on the same frame. Thereafter the ejector 34 ejects the unit record and the system causes the film to be advanced so that it is available for the next transaction and (in particular cases) causes cash to be dispensed through the cash dispenser window 37a. These interactive steps between the terminal and the financial institutions that are involved integrate the account updating and record keeping needs of each institution involved in the transaction.

Figure 7:
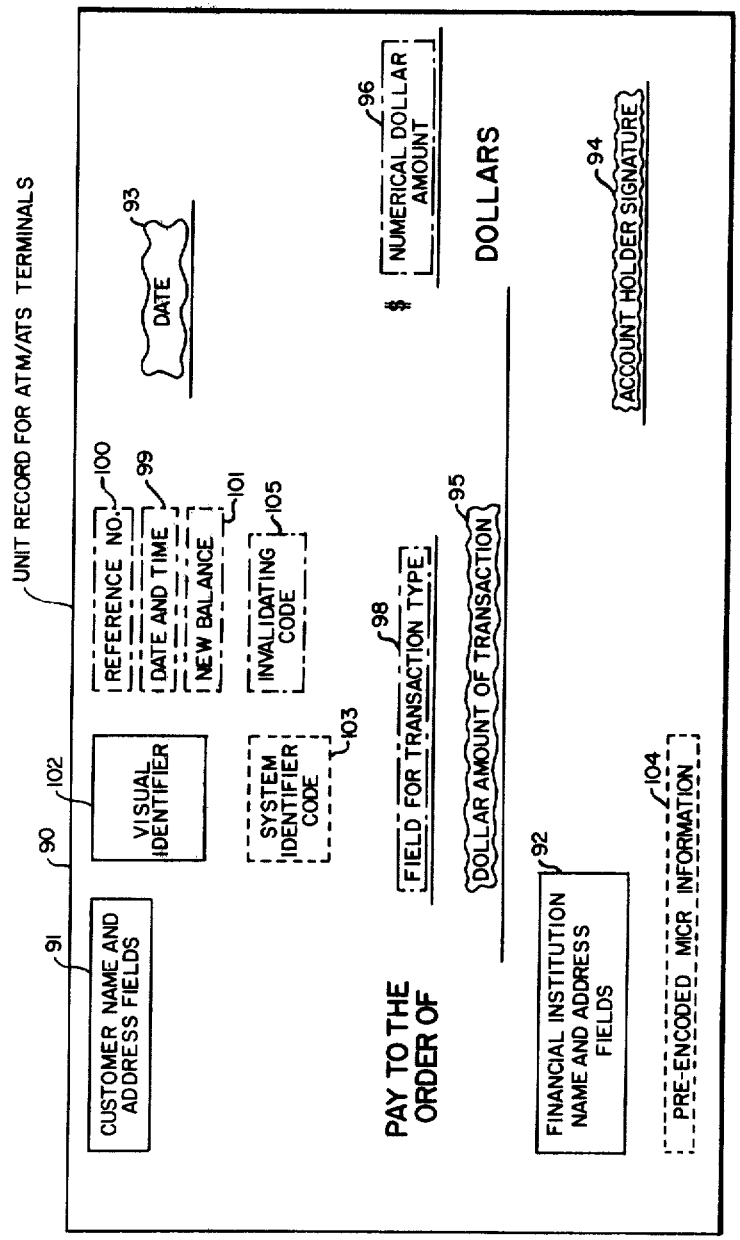
FIG. 7 is a diagram of a completed unit record of the type used with an automated teller machine or automated teller system terminal.

A detailed operation of the terminal 25 of FIG. 2 takes place in the following manner, referring now to FIGS. 1, 2 and 7. The account holder first fills out the negotiable unit record with the appropriate date and dollar amount in conventional fashion in fields 93 and 95, respectively, of the negotiable unit record as shown in FIG. 7. The signature is entered, and the negotiable unit record 10 is placed in the check tray of the unit record receiver 33. The numerical indication of amount on the unit record (field 96 in FIG. 7) should be left blank. Insertion of the unit record 10 in the slot of the receiver 33 operates the detector 39 to generate a signal for initiating the operation of the code reader 38. The reader 38 may be an optical character recognition type or MICR type reader and is positioned so that it is capable of reading the ABA account information number coded on the particular negotiable unit record. The use of such a reader allows the principal fields of a standard check to be utilized in the operation of the system. Where there is no terminal, or if the electronic system or a particular mechanism such as the microfilm camera fails, the same negotiable unit record may be completed and handled in the conventional manner for check purchases.

If the customer has multiple accounts, linkage indicators are resident in the central computer memory of the customer's financial institution. These linkage indicators interrelate the checking account number on the negotiable unit record being used to all other pertinent accounts that are also held by the customer. This facilitates transfer of funds between accounts by the processor 19 or 23 upon the insertion of a single negotiable unit record without additional account information.

The code reader 38 derives the account information and transfers a digital signal representing this information tion via the input selector gates 41 to the input message shift register 42. The executive program 45 of the microprocessor 46 causes a shift of information from the input message shift register 42 to storage in memory 47 under control of the output message format program in the applications programs 44 of the microprocessor 46. The output message format program stores the account information in an appropriate location of memory 47.

The account holder first inserts the unit record in the slot, and enters his PIN on the keyboard 29 when instructed to do so either by illumination of the Key-in PIN button on panel 27 or a Key-in PIN instruction displayed on video display screen 31. The ABA account number and the PIN signals are routed to the input selector gates 41 and the shift register 42 and thence to memory 47 of the microprocessor 46 by the output message format program as described above. If desired the PIN may be displayed on the amount display 36, provided it is so positioned as to be viewable only by the customer or on a small private display (not shown) similarly positioned, so that it may be monitored and revised if incorrect by use of the "Clear" button. After the PIN has been entered the output message format program causes the ABA account number and PIN to be routed to the output 48 and output message buffer 58 in an appropriate form for transmission to the central data processor 19. If a corresponding ABA account number-PIN pair is found by data processor 19 or 23 a signal is transmitted to the ATM terminal 25 which causes the "Select Transaction" button to light or, alternatively causes a similarly worded instruction to be displayed on the video display screen 31.

After the transaction code has been routed via gates 41 and register 42 to memory 47, the account holder is instructed to key-in the dollar amount of the transaction on the keyboard 29. The data keyed in is routed to the input selector gates 41 and thence to shift register 42 and the digits of the amount held in the shift register 42 are displayed by the dollar amount display 36. If an entry in any step of the sequence is incorrect, the sequence may be repeated after pressing the "Clear" button on the keyboard 29. The completed entry is transferred from the input message shift register 42 under control of the message format program to the microprocessor memory 47. After the dollar amount has been entered the message format program causes the transaction type and dollar amount data to be routed to the output message buffer 58, from where it is transmitted to the central data processor 19.

Instead of transmitting two separate messages from the terminal 25, as described above, it is also possible to transmit only one message containing the ABA account number, PIN, type of transaction and dollar amount. Either mode is readily programmable and the choice will depend on a trade-off taking into account the likelihood of erroneous data entries by the account holder and the effect on communication line traffic. In either mode all four data items are retained by microprocessor 46 until the central processor 19 or 23 has accepted or rejected the transaction.

In an alternative arrangement of the invention, the Place Check in Slot, the Key-in PIN, Press Enter Button, Select Transaction, and Key-in Dollar Amount buttons of the customer instruction sequence panel 27a are replaced by a video display program that sequentially presents on the video display screen 31 the steps to be taken in making a transaction.

The use of the Personal Identification Number (PIN) allows the system of the present invention to be more secure than present checking systems. The PIN is a secret number issued to or selected by an account holder. The PIN and ABA account number are stored in a customer's central account by the data processor 19 or at another financial institution 23 if used by the account holder. In the following description wherever reference is made to usage of a customer file at a financial institution it should be understood that it may be either the institution designated as 19 or that designated as 23. Activation of the system through a terminal such as terminal 25 calls up these numbers from the account holder files, wherever they are located in the system of FIG. 1. The PIN and the ABA account number assigned to the particular account holder and stored in the data processor 19 or 23 are checked in the appropriate facility to verify a match with the corresponding numbers read from the unit record by the code reader 38 and keyed into the system by the account holder at the keyboard 29. In addition where a financial institution teller is involved (ATS system) or a salesperson is involved (POS system) that person should verify the signature on the negotiable unit record, before it is entered into the terminal, thereby providing a further degree of security.

If the operation to determine the identity of the account holder shows an incorrect matching of data entered at the terminal with the information contained in the data processor 19 or 23 the particular transaction is rejected and a signal is generated by the processor 19 or 23 and transferred via the data link 17 to the ATM terminal 25 to illuminate the Re-enter PIN indicator of the status command panel 28. It is usual to presume that an error in entry of the PIN has taken place and to, therefore, require the re-entry of the PIN for a limited number of trials. The data processors 19 and 23 may be programmed to count the number of attempts which have been made, terminate the attempts after a prescribed number of failures during a particular period, and generate a signal which is transferred via the data link 17 to the ATM terminal 25 to illuminate the "PIN Invalid: Pick Up Check" button on the status command panel 28. In such a case, the signal from the data processor 19 or 23 may also activate the video display program of the microprocessor 46 to cause the display of a message asking the account holder to contact his financial institution personally to solve the problem. Allowing a limited number of attempts to establish identification statistically reduces the possibility of an unauthorized person entering the system by punching in PIN codes at random.

Data in the output buffer 48 (FIG. 2) of the microprocessor 46 is transferred to the output message buffer 58 of the communication controller circuitry 56 and to the printer buffer 69 where the data are held awaiting an authorization from the data processor 19 or 23. The message buffer 58 temporarily stores the information entered at the terminal 25 including the ABA account number, the PIN, the transaction type code, the dollar amount, and the terminal identifier code. Under control of the timing and control circuits 60, the information in buffer 58 is relayed by the transmitting circuits 64 to the data link 17 and thence to the data processor 19 of the ATM/ATS financial institution. The message from the terminal 25 to the financial institution's data processor 19 may also be encrypted before transmission. In general, it is desirable that information be encrypted before transmission over any of the data links of the system.

After verification of customer identity by the data processor 19 or 23, the transaction information, such as a transaction requesting cash withdrawal from savings, selects the particular routine from program memory. The account balance information stored in the customer account file at the processor 19 or 23 is then checked by the routine and the savings account of the customer is charged with the withdrawal of the particular amount indicated. In the case of a cash withdrawal, the program includes a funds verification check to determine that the funds on deposit or a line or credit is available in the account sufficient to cover the withdrawal. The same verification check is included in all transfer and payment type of transactions in which funds are taken from one of the accounts. A failure to meet this condition causes the processor 19 to transmit a signal to illuminate the "Insufficient Funds—Pick Up Check" indicator on the status command panel 28 (FIG. 4).

Presuming that the account balance is sufficient, the debiting of the customer's savings account is accomplished automatically by the data processor 19 or 23 and the appropriately adjusted balance is stored in the customer files where it may be later used to generate the customer's monthly statement.

When the debiting operation has been completed at the customer's financial institution and the customer's account debited and the financial institution's account credited in the memory of data processor 19 or 23 the data processor 19 transmits back to the terminal 25 via the data link 17 an authorization message which contains the information needed for completion of the particular transaction at the terminal. This information is received by the receiving circuits 66 (FIG. 2) under control of the timing and control circuits 60 and is transferred to the input message buffer 62 of the ATM terminal. The authorization message contains an authorization number used for security purposes as described earlier, and also essential transaction data such as transaction type and dollar amount, the date and time, reference number, and the post transaction balance of the account holder's account for imprinting on the unit record. The information effectively authorizes the transaction and controls postprinting on the front of the negotiable unit record, cancelling of the check to produce a permanent record as discussed in further detail hereafter, display of account balance data on the video display screen 31, and activation of cash subsystem 37 for a cash withdrawal transaction. The information to be post printed is transferred to the printer buffer 69 and thence to the printer 70 for printing on the unit record 10. If the transaction type code specifies a cash withdrawal, as in this example, detection of that code by an appropriate decoder in the terminal input message buffer, or alternatively by the microprocessor, causes activation of the cash subsystem 37 to dispense the amount also contained in the authorization message. Account balance data may be routed from the input message buffer 62 or, alternatively via the microprocessor 46 to the video buffer 63 and displayed under control of a conventional video display program on the video display screen 31.

Unit Record Format

Detailed reference may now be made to FIG. 7, which shows particular details of a unit record 90 in accordance with the invention, and in which preprinted non-machine readable information fields are defined by solid line borders, preprinted machine readable information fields are defined by dotted line borders, account holder entered information fields are delineated by wavy line borders, and information fields post printed by the terminal are defined by dot-dash line borders. For descriptive purposes, a "field" on the unit record is any area bearing a specific type of entry. For example, the customer name and address fields 91 and financial institution name and address fields 92 are imprinted in conventional locations and the overall format corresponds in these and other conventional respects to a traditional bank check and may be so used. The account holder enters the date information and his signature in correspondingly designated fields 93, 94 respectively, and also fills in the dollar amount in writing in a field 95 corresponding to the usual location. The numerical dollar amount is printed by the unit record printer 70 (FIG. 2) in the numerical dollar amount field 96 as verification of the amount specified by the account holder in field 95.

In the system being described, a negotiable unit record may be used as a universal funds transfer instrument for deposits, transfers, loan withdrawal transactions, cash withdrawals and payments and also for balance inquiries. The exact nature of the transaction is delineated in the information that is post printed upon the negotiable unit record. Specifically, this information is contained in a "transaction type" field 98, corresponding to the normal "payee" entry, and post printed on the unit record 90 by the printer in the system as verification of the transaction type selected by the customer by means of the transaction selector 27. The printer also may function to print the date and time (to the precision required) of the transaction in a selected field 99 under control of the central processor. The reference number is entered in field 100, and uniquely enables a record of the transaction to be traced by providing a common reference for all those involved, whether records are kept in physical form or in electronic storage. The date and time are redundant but can be a considerable customer convenience. The printer may also print in field 101 for the account holder's reference the new balance resulting from this transaction.

It is convenient and useful to preprint the unit record 90 with a visual identifier field 102, which may comprise a logo, trademark or characterizing word by which the account holder, merchant, teller or salesperson can identify the unit record as being issued by a financial institution that has the capability to use it in this electronic funds transfer system. The logo or pattern may be machine readable, but it is preferred to accompany this visual system identifier field 102 with a system identifier code field 103, which may be in OCR, MICR or other machine readable form. In addition if a unit record has been previously used in a terminal, a machine readable cancelled or voided designation will have been printed in an invalidating code field 105 (which may be either within or adjacent to field 103) as described in the paragraph following. The other preprinted machine readable data is located in a field 104 for the pre-encoded MICR information, which includes the Federal Reserve routing symbol, financial institution identifier, account number, check number and check digit.

In the case of a deposit, the "transaction type" field 98 records that the deposit was made to a specified account. The source of the funds being deposited may be checks or cash. The transaction type field 98 indicates the account affected. The new balance field 101 may show the revised balance in the account affected by the transaction or, in the case of transfers, the accounts affected by the transaction. The imprinted numerical dollar amount field 96 is also printed by the terminal and may be checked by the customer to determine that the amount matches what he wrote in field 95. With these essential entries, the unit record 90 is transformed from its negotiable character to a completed transaction record. The terminal also prints evidence of a completed unit record by means of a machine readable code, e.g., a series of 1's, in field 105, which is preferably on the same line as field 103, so that the same reader may be used to scan both fields 103 and 105. A machine readable code is also printed in field 105 when necessary to indicate that the proposed transaction has been voided. In both cases the intent and effect is to prevent multiple usage of a unit record. The unit record 90 may have some of the fields disposed on the reverse side of the document if desired.

When all the items in the post printed fields (dot-dash line borders in FIG. 7) have been printed on the unit record 90 of FIG. 7 (numeral 10 in FIG. 2) by the printer 70 (FIG. 2), a signal is produced causing the camera 75 in the microfilm system to photograph the front of the unit record to provide a permanent audit record. The microfilm record may be contained within a secure cassette or advanced into a tamper-proof canister in such a way that access can be gained to it only by authorized staff. In this instance, the microprocessor 46 provides transaction code information in binary form to the binary code display 76, which may be of the miniature light emitting diode type, for recording the index code on the margins of the microfilm. Such a code enables the microfilm to be scanned automatically to locate the needed frame if a question should arise as to the transaction. The microfilm record retrieval process provides an audit trail for purposes of resolving a customer dispute or questions about the transaction because a permanent record of the completed unit record is thus made accessible to the financial institutions involved. The completion of the operation of the microfilm camera 75 generates a "filming complete" signal for the operation of the unit record ejector 34 to cause the completed unit record 10' (FIG. 2) to be fed out of the slot in the unit record ejector 34 in the console 26 for retrieval by the account holder and in the case of a cash withdrawal authorization enables the cash dispensing mechanism 72 in the cash subsystem to dispense the appropriate amount. When any requested transaction has been completed, e.g., the balances in the customer's file at the central computer have been appropriately adjusted, and in the case of a cash withdrawal, the money dispensed to the customer, then the "Transaction Complete: Pick Up Check" light on the status command panel 28 is illuminated.

In view of the fact that the microfilm subsystem 74 provides a permanent record for the financial institution and allows a customer to replace lost records, means are provided to assure against camera failure. It is of course feasible to provide a backup camera activated by a camera inoperative signal from the camera 75. In the present example the printer 70 generates a "record void" indication in field 105 of the unit record when the camera 75 is not operating. The camera mechanism then also indicates to the microprocessor 46 that it is inoperative. The microprocessor can then initiate action that causes the data processor 19 to reverse the transaction. Such a signal also renders the terminal 25 inoperative and so indicates (by "Terminal Not Working") on the status command panel 28 until the malfunction is corrected.

Obviously, other functions are accomplished by the terminal 25 in a like manner. For example (referring additionally to FIG. 4), to make a deposit into a customer account, the customer writes in fields 93, 94 and 95 of the unit record 90 (FIG. 7) and places the unit record into the unit record tray of the receiver 33. The PIN is then keyed in and entered. Assuming an appropriate customer identification, the button for the account to which the deposit is to be made (e.g., to Savings) is depressed, the dollar amount is keyed-in and both of these items are entered into the system. This information is relayed in a manner described elsewhere herein to the data processor 19 to effect the transaction and a signal sent back to imprint the unit record with the proper transaction indications. In the case of a Deposit, the credit to the account affected is tentative and information to that effect is stored in the account holder's file in the data processor 19 or 23. The account holder must also deposit the funds in an envelope which is inserted into a depository drawer within the ATM. When the contents of the customer's deposit envelope are confirmed by financial institution personnel, the central processor 19 may be accessed for the purpose of confirming the amount of the deposit.

A transfer from account to account is effected by the same initial steps of inserting the unit record in the unit record receiver 33, entering the PIN, selecting the transaction, in this case depressing the button on the transaction selector 27 which indicates the pair of accounts to be affected (e.g., Savings to Checking) and keying in the dollar amount. This enables the data processor 19 or 23 to accomplish the transfer and send signals to terminal 25 resulting in a completed unit record.

A payment from a checking account in the financial system to another account in the system proceeds in a like manner. A balance inquiry differs from the other operations only in that a dollar amount is not keyed in. All other parts of the operation will be analogous, however, with the appropriate button in the Balance Inquiry column of the transaction selector 27 being depressed to designate the account of interest. The provision of a balance inquiry operation is especially useful in that it allows a customer to determine before commencing a transaction the balance in the account to be drawn on. Such a determination followed by the immediate automatic processing of the transaction essentially eliminates the possibility of an overdraft.

Customer Operating Sequence

The customer operating the ATM terminal is guided through the entire sequence in direct and unambiguous fashion, utilizing the transaction selector panel 27, the customer instruction sequence panel 27a (or video display screen 31 as previously described) and the status command panel 28 (FIG. 4). It will be recognized that where the terminal panel includes a video display screen 31, as in FIG. 4, all messages and instructions may be displayed on the face of the screen. In the present instance, however, the illuminated panels 27, 27a, 28, and the display screen 31 are employed, the latter being used for the multiple account option described below in more detail. The transaction selector panel 27, the customer instruction sequence panel 27a, and status command panel 28 provide low cost input/display and display devices respectively, that cover most choices and conditions to be encountered where a reasonably limited number of operative options are to be used.

In the customer instruction sequence panel 27a, a group of four customer instruction sequence lights identify, serially as they are used, the basic steps of (1) placing the check in the slot, (2) keying in the PIN, (3) selecting the transaction and (4) keying in the dollar amount. The headings of each successive column on the transaction selector panel 27 (e.g. "Cash Withdrawal" and "Deposit") are continually lit to identify the various choices in the particular column. However, the customer looks to the status command panel 28 for the relatively few commands that are needed in the event of error or system problems. These commands are instructive as to the integrated nature of the system and are therefore described in some detail immediately hereafter. The sequence given corresponds to that used, substantially arbitrarily, for the buttons on the panel 28 and should not be taken to represent the order in which events will transpire in any given instance.

(1) The "Ready: Begin Transaction" light indicates that the terminal is ready to receive transactions. It is energized either locally or by a signal from the central processor 19 when the system is activated and checked out at the beginning of each business day. It is activated also each time a unit record is ejected by the unit record ejector 34. In any event the customer looks to the instruction sequence lights on panel 27a to know when to place the check in the slot, enter the PIN on the keyboard 29, select the desired transaction on the panel 27, and enter the dollar amount on the keyboard 29.

(2) A "Re-enter Transaction" light is activated on the status command panel 28 when the customer's financial institution indicates that the account number is not present in the records. This may mean that the account number has been misread or improperly transmitted, and this assumption is made the basis for subsequent steps until a new check has been tried and a predetermined number of attempts made for satisfactory data entry. The error condition may also be indicated by the local ABA code error detector 52 at the terminal itself.

(3) The "Check Defective: Insert New Check" light signifies the local ABA code error detection condition, which may be programmed to require two or more attempts to read this code from the original unit record.

(4) When the customer's financial institution can find no match of the entered PIN in its account files, the "Re-enter PIN" light is lit, enabling the customer to correct a prior error.

(5) However, when an incorrect PIN has been tried more than a predetermined number of times, the "PIN Invalid: Pick Up Check" light indicates that no further attempts are to be made.

(6) Although a correct PIN may be entered, validation of a transaction requires not only matching of the account number and PIN, but also verification of sufficient funds, by the customer's financial institution. When all conditions cannot be met, then the panel indicates "Insufficient Funds: Pick Up Check" and the attempted transaction is terminated. In this usage the term "Insufficient Funds" covers the general "Unauthorized" condition.

(7) On the other hand, when all entries are satisfactory and the customer's financial institution returns its Authorization Message, and the unit record has been properly imprinted and a "Filming Complete" signal provided, no further steps need be performed. Thus the indication is given of "Transaction Completed: Pick Up Check".

(8) At any time, an internal error or malfunction detected within the terminal, microprocessor or data link may cause the "Terminal Not Working" display light to be activated. Conventional devices and circuits may be used for this purpose, and these have not been described in detail.

(9) If the transaction is complete and the detector 54 at the unit record ejector 34 indicates that the completed unit record remains in the slot, the customer is reminded to retrieve the completed unit record by activation of a flashing light designated "Reminder: Please Pick Up Check" together with activation of the audible alarm 53 (FIG. 2).

(10) Where the customer attempts to utilize a check that is not adapted for use as a unit record, the system identifier code reader 51 provides a signal to the microprocessor 46 (FIG. 2) that the required machine readable code in field 103 (FIG. 7) is absent. Thus the customer is informed of the error by activation of the panel segment designated "Improper Check for This System". The same may be indicated if the inserted document has previously been voided or cancelled, or inserted upside down or backwards.

Multiple Account Option

Reference to FIG. 4 shows that the transaction selector panel does not provide for the case where the customer has more than one account of a particular type. Multiple accounts may be provided for by the following type of arrangement. After the customer has caused his ABA account number and PIN to be transmitted to the data processor 23 of the customer's financial institution, the data processor 23 transmits also, a message containing the numbers of all accounts of a given type for those cases where the customer has more than one account of a given type, or alternatively, the numbers of all the accounts held by the customer. That information is routed to the microprocessor 46 and incorporated into an account listing display program which causes a display on the video display screen 31 of account numbers of all accounts held by the customer. In this display each account number is preceded by a number. For example, the display could contain entries such as "3. Savings Acct. 484 502 163" or "5. Checking Acct. 217 482 19." The customer would then be instructed to enter on the keyboard 29 the number preceding the account to be affected followed by depression of the "Enter" button and the transaction selector button corresponding to the desired type of transaction. If the transaction involves two accounts the customer is instructed to enter also the number preceding the second account to be affected, followed by depression of the "Enter" button, before pressing the appropriate transaction selector button.

A theoretically unlimited number of financial transaction options can be provided by the following type of arrangement. The transaction selector panel is eliminated completely. By way of example and not as a limiting requirement the microprocessor 46 can cause to be displayed on the left side of the screen a listing of all types of transactions available to the customer, each type of transaction being preceded by a listing number; on the right side there can be displayed a listing of all the customer's accounts, each account also being preceded by a listing number. The heading on this display, which is also generated by the microprocessor 46, instructs the customer to enter the listing number corresponding to the transaction option he wishes to select, and also the listing number or numbers corresponding to the account or accounts affected by the selected transaction. Each of these entries is made utilizing the digit buttons and enter button on the keyboard 29. The number of options and accounts is not limited by the size of the screen. In the case where more than one frame is required to display all options available, the display instructs the customer to press an "options" button, not shown in FIG. 4, which causes the microprocessor to display the next frame of options. Each pressing of the "options" button causes the next frame to be displayed. In the case where the customer presses the "options" button and there are no options other than those already displayed, the first frame is displayed again. Once the customer has selected the particular option desired the transaction proceeds in the fashion previously described.

Automated Teller Station Terminal

Figure 5:
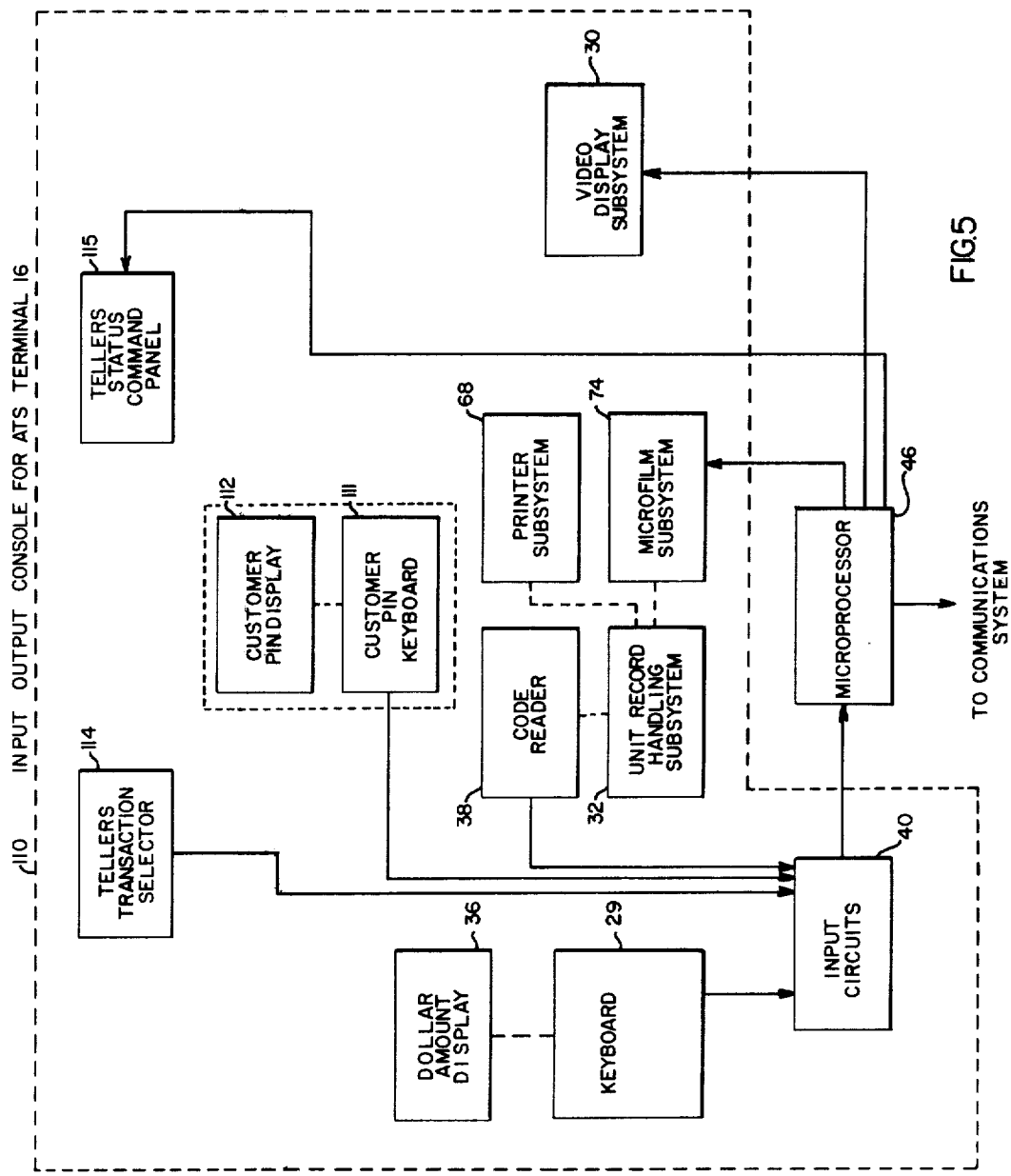
FIG. 5 is a block diagram of the principal elements of an automated teller system terminal constructed in accordance with the invention.

The automated teller station (ATS) terminal 16 of FIG. 1 is substantially like the automatic teller machine terminal 25 of FIG. 2 and its uses are substantially the same. However, the ATS terminal 16 is used by a teller in a financial institution and the input-output console 110, as seen in FIG. 5, differs from the terminal 25 of FIG. 2 in providing a separate PIN entry keyboard 111 and an additional PIN display 112, which are optional with the financial institution, while not requiring a cash subsystem 37 because this function is handled by the teller. Both the keyboard 111 and the display 112 are positioned out of view of the teller who operates the teller's console 110. The teller's transaction selector 114 and status command panel 115 correspond, in specific entries, to those used on ATS terminals of the types now in use and have not been set out in detail.

In a typical transaction, the customer presents himself at the teller station and informs the teller of the nature of his intended transaction. The transaction may be to withdraw funds from an account, to deposit funds to an account, to transfer funds between accounts, to request information about the balance of an account, or to make payment to some predetermined account such as a loan from the particular financial institution. The customer fills out his unit record with the date and dollar amount of the transaction, and signs the record, which he then hands to the teller. The signature on the unit record provides the normal means for the teller to verify customer identification so that the PIN entered by the customer is, in fact, a redundant check that is optional in this environment. After verifying the signature through traditional identification procedures, the teller inserts the unit record into the receiver of the unit record handling system 32 where it is read by the code reader 38. Once entered, the teller instructs the customer to enter his PIN by means of the PIN keyboard 111, if this optional level of customer identification is deemed necessary by the financial institution. The PIN keyboard 111 and PIN display 112 are viewable only by the customer. A "Clear" button associated therewith (not shown in detail) allows corrections to be made. When the customer enters the PIN, the PIN displayed is transmitted to the other functional units of the teller's console 110, which is otherwise similar to an ATM in functional capabilities except for the means for instructing the customer in the sequence of steps he must perform. This information is all entered into the memory of the microprocessor 46 under control of the message format program 46 and transmitted to the data processor 19' (FIG. 1) for the ATS financial institution, where the account holder security check process is begun as discussed above with regard to the ATM terminal. In a case in which the transaction is rejected, the teller advises the account holder of the rejection and the next step to take.

Upon a satisfactory completion of the security check, the teller enters the type of transaction and the amount of transaction by means of his own transaction selector 114 and keyboard 29. If the teller has inadvertently entered the wrong transaction or dollar amount, the "Clear" button may be depressed, as explained above, and the correct instructions entered. The data is transferred to the microprocessor 46, and once the teller has verified that these items have been entered correctly, he presses the Enter button causing the contents of the output of the microprocessor 46 to be communicated to the financial institution data processor 19' via the data link 17 (FIG. 1).

The microprocessor 46 and data link 17 (FIG. 1 only) are used to temporarily assemble and store all of the data entered via the automated teller station terminal prior to transmission. This message consists of the account number read by the code reader 38, the PIN (if used), the transaction code, and the dollar amount. It may also be programmed to include the particular branch of the financial institution and a teller code. It should be noted that the message from the terminal to the data processor 19' may also be encrypted prior to transmission in this instance.

Presuming that the transaction is completed by the data processor 19', as explained above, the results are signaled to the ATS terminal so that the appropriate transaction data may be printed on the unit record. After this printing by the check printer subsystem 68, the completed unit record is automatically advanced to the microfilm system 74 where it is photographed and automatically ejected. The completed unit record is returned to the customer by the teller.

Point of Sale Terminal

Figure 6:
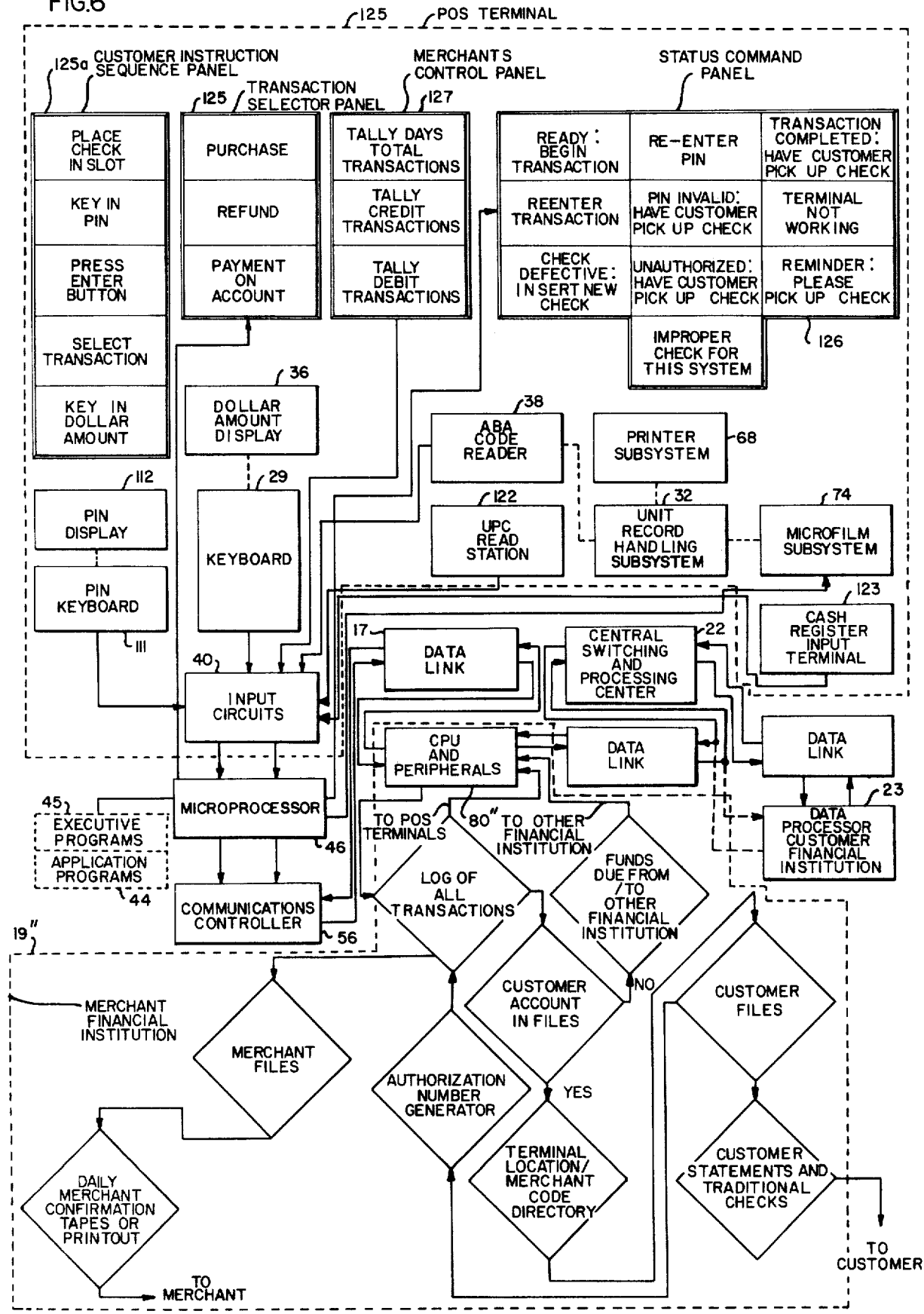
FIG. 6 is a block diagram of the principal elements of a point-of-sale terminal and associated elements of a remote central data processing system in accordance with the invention.

Referring now to FIG. 6, there is shown a block diagram of a point of sale (POS) terminal 120 (equivalent to the terminal 18 of FIG. 1), which may be used in the system of the present invention, and in which units like those of the ATM terminal of FIGS. 2 and 4 are similarly designated. Such a terminal 120 is positioned on a merchant's premises and is operated by his staff in order to process unit records presented by a customer for the purchase of merchandise or services. Consequently, it is useful for the terminal to be able to accumulate records (as does a cash register) as to sales prices, taxes on such sales prices, totals of sales prices and taxes, and daily tabulations. It is also useful for the point of sale terminal to provide a record for the merchant of such transactions so that he need not go through the process of personally handling the unit records, presenting them to his financial institution, and accumulating records thereof.

Additionally, it is important in non-cash transactions for a merchant to have a record of the customer's source of funds for payment of merchandise or services at the point of sale. This is true because funds which originate from a line of credit extended by the customer's financial institution involve a first level of risk and a predetermined charge while funds which originate from a positive cash balance in one of the customer's accounts involve a lower level of risk and a different charge. The system of the present invention provides a means for computing the different charges for funds and provides the merchant with a record of total funds by category for the purpose of negotiating with his financial institution the particular charges for a particular type of service and so that the merchant has an immediate record of what his charges for the services are.

As shown in FIG. 6, the point of sale terminal 120 comprises all of the elements of the previously described ATM terminal 25 (FIG. 2) plus a Universal Product Code (UPC) read station 122 and a cash register input terminal 123 both feeding into the input circuits 40 for the microprocessor 46. An accumulator program is utilized in the microprocessor 46 for storing and making available cumulative and running totals of transactions by the type of account utilized. The point of sale terminal 120 also differs from the ATM terminal 25 as to the transaction selector and status command panels. The transaction selector panel 125 of FIG. 6 includes only buttons for keying in whether the transaction is a purchase, refund or payment on an account.

Virtually the same procedures as used for making a purchase are used to reverse or refund a previous unit record transaction. The customer writes the date, the amount of the refund and his signature on the unit record. The unit record is then entered into the terminal, followed by the transaction sequence of instructions starting with the button marked "Refund" on the Transaction Selector Panel 125. A completed unit record for this type of transaction contains the appropriate terminal generated information including the printing of "REFUND" following the merchant's name in field 132, FIG. 8. A similar procedure is used for making a payment to reduce the balance owing on an account. In this case the "Payment on Account" button on the Transaction Selector Panel 125 is used, and the completed unit record will include the printing of "PAYMENT ON ACCOUNT" following the merchant's name in field 132, FIG. 8. A separate merchant's control panel 127 has buttons for the tally functions, including "Tally Debit Transactions" and "Tally Credit Transactions". However, the status command panel 126 is essentially labeled the same as the panel 28 of the ATM terminal of FIG. 4. In addition, the point of sale terminal 120 has, like the ATS terminal of FIG. 5, a separate keyboard 111 for keying in PINs and an associated display 112 for the display of a PIN, both separately positioned so that only a customer can view the PIN when it is keyed into the terminal to provide a positive check of the customer's identity. On the other hand, the merchant may desire to utilize other means of identifying a customer such as driver's license or the like so that a particular terminal need not be equipped with means for accomplishing the PIN check.

Figure 8:
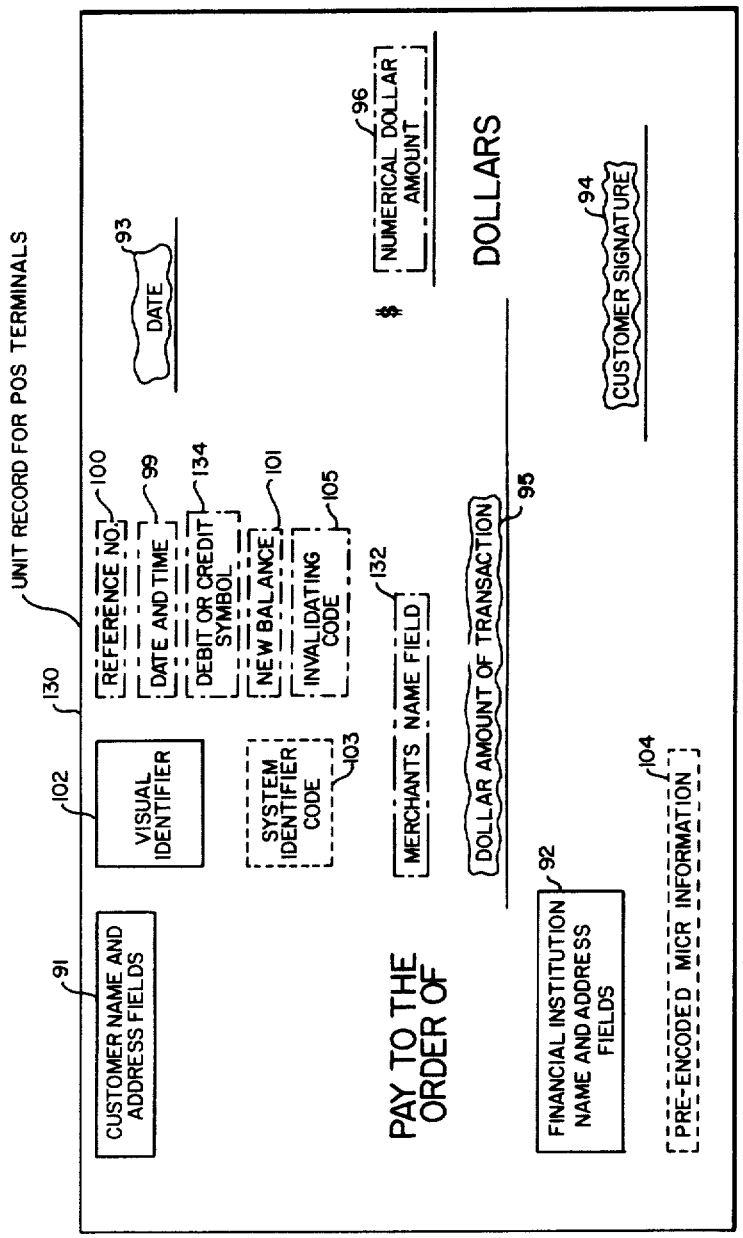
FIG. 8 is a diagram of a completed point-of-sale unit record.

The negotiable unit record 130 for the POS terminal is shown in completed form in FIG. 8. The previously described and traditional fields 93, 94, 91, 92 include date, customer signature, customer name and address and financial institution name and address. The written amount field 95 also corresponds to that in the unit record 90 of FIG. 8, but the traditional payee entry is used as a field 132 for the merchant's name, to be imprinted by the terminal along with the numerical dollar amount in the field 96. The machine readable fields 103, 104 and 105 remain as previously described as do the post-printed reference number, date and time and new balance fields 100, 99 and 101 respectively. However, a new "debit or credit symbol" field 134 is added to provide an indication of the source of funds provided by the customer's financial institution (funds on account or funds from a line of credit). The reference number field 100 in this instance corresponds essentially to that used for the ATM terminal, and may include a code designation identifying the register or the clerk, or both uniquely.

Referring again to FIG. 6, the substitution of a point-of-sale terminal 120 for the ATM terminal 25 requires only the change of the input-output console at the terminal end, together with a limited amount of software change to cause imprinting of the extra information and entry of the merchant's name instead of transaction data, and other conventional details of this type. At the merchant's financial institution 19" of FIG. 6, transaction processing is similar to that described for the ATM/ATS financial institution, as evidenced by the flow sequences indicated by the diamonds in the figure. In a POS transaction there is also a need for a merchant file containing all terminal transactions which are summarized daily on confirmation tapes or printouts supplied by the merchant financial institution to the merchant. However, the system as a whole now generally involves at least two financial institutions, because in the usual instance the merchant's financial institution will be different from the customer's financial institution. The system therefore may have either a direct connection between the merchant's financial institution and the customer's financial institution or an integrated electronic funds transfer capability, via a Central Switching and Processing Center 22 as shown in FIG. 1 and FIG. 6. The data processor 19" now represents the merchant's financial institution, which may be in direct communication with the customer's financial institution 23 via the data link 20. Alternatively, communication between the merchant's financial institution and the customer's financial institution data processor 23 may be undertaken through the Central Switching and Processing Center 22, as in the system described in FIGS. 1 and 3. The data processor for the customer's financial institution 23 scans the customer's files and authorizes the transaction, transmitting to the POS terminal 120 an authorization message which now also contains debit-credit data for field 134 in addition to the other data items for post printing contained in the ATM/ATS authorization message. Real time interaction between the systems provides the accessing to different files that is needed in order that the merchant, the merchant's financial institution and the customer's financial institution can all input, extract and create the needed information.

The operational description of the POS terminal 120, FIG. 6, proceeds as follows: The customer purchases a particular item or negotiates for particular services, and the amount is determined. The merchant registers the amount on his cash register, computes the tax thereon, and informs the customer of the total. The customer writes in fields 93, 94, and 95 of the unit record. The unit record is given to the merchant, where the signature is verified in the conventional manner and note is taken to insure that the payee amount for this purchase has been written in field 95. The merchant then inserts the unit record into the unit record handling system 32 and the check tray of the mechanism is closed to initiate the operation of the POS terminal 120. The account information is read by the code reader 38 and transmitted by the input circuits 40 to the microprocessor 46. The merchant then keys in the amount, the tax, and/or the total amount of the transaction utilizing the keyboard 29. Alternatively this may be done automatically by the Universal Product Code (UPC) read station 122 and/or the cash register input terminal 123. The type of transaction is selected by means of the transaction selector panel 125. The dollar amount and type of transaction data are routed from the input circuits to the microprocessor 46 under control of the message format program.

After this has been accomplished, the customer may be directed on the transaction selector panel 125 to insert his PIN by depression of the keys on the PIN keyboard 111. As the number is transmitted to the memory of the microprocessor 46, it may be displayed in the PIN display 112 allowing the customer to make corrections as explained above. The merchant and/or customer is guided in the sequence of steps to be taken by means of the instruction sequence panel 125a. The message format program controls the storage, formatting and assembly of all data items originating at the terminal, following which these items are transmitted via data link 17 to the merchant's financial institution data processor 19". The totals accumulated for both credit and debit type transactions remain in the memory of the microprocessor 46 so that they may be read out by the merchant on the display 36, or other convenient display that may be provided for this purpose, at any time he may wish. This allows the merchant to have at hand an immediate indication of his charges for the various services provided by the financial institution. The information provided to the microprocessor 46 regarding subtotals and tax amounts is accumulated by the microprocessor 46 and the total transferred to the printer buffer 69 in the printer subsystem 68 to be held in storage and printed as a part of the post printed data on the unit record.

Presuming that the transaction is not authorized by the data processor 19" because the PIN is wrong, the account number is wrong, or the account is overdrawn, the appropriate indicator on the status command panel 126 will be lighted and the operation of the terminal will notify the merchant to tell the customer to re-enter the PIN, insert a new check or that the transaction is unauthorized. If the transaction is authorized by the data processor of the customer's financial institution 19", it proceeds as does a transaction by an ATM terminal with the data processor at 19" signaling the POS terminal 120 with an authorization message containing an authorization number and all items of information to be post printed on the unit record. If the authorization number received agrees with that derived at the terminal, the unit record is post printed with these items of information and the completed unit record is copied by the microfilm subsystem 74.

Should the terminal be inoperative, the customer would complete the purchase or financial transaction through the use of the unit record as a conventional check which would be handled and processed through the nation's funds transfer system in the traditional manner.

The accumulator programs at the microprocessor 46 store essential details of each transaction so that at the end of each day the merchant has a tally of transactions by source and type, and cumulative dollar amounts. These can be called out by means of the merchant's control panel 127 as daily tallies of debit, credit and total transactions.

The system described herein eliminates the handling of customer checks by the merchant and processing steps by the various financial institutions, for the customer retains the cancelled check equivalent. Each day the merchant removes the microfilm canister, which he deposits with the financial institution to enable possible retrieval of images of a unit record transaction. Manual check and refund processing requirements are eliminated for the merchant, who has access through his financial institution to any single transaction on the microfilm by virtue of the audit trail available through the unique reference number. The merchant thus need not gather the checks from the customer, endorse them, take them to a financial institution, and be subject to funds credit delays inherent in manual check processing methods. The system provides that verified funds are held for the merchant under a promise by the customer's financial institution to pay so that the merchant is assured that unit records processed through this system are not subject to the costs of collection services. The system also provides the merchant with immediate knowledge of his source of funds and total amounts of such funds by type so that he has the ability to negotiate with his financial institution the prices to be charged for such services. Furthermore, as the transactions take place, the merchant can interrogate the terminal by means of the control panel 127 to determine the total amount of credit and debit transactions accumulated to that time from which he can readily determine the fees he has incurred with the financial institution.

Monthly Statement Preparation Process

The following procedures describe the processing operations that are used to inform the customer of the previous month's unit record transactions. Once a month, or at some periodic time, the customer's financial institution creates a statement that contains a listing of the accumulated charges, deposits and conventional checks processed for the customer since the last statement rendering period. In the course of accumulating this information the central processing unit 23 accesses the customer's files to extract the following information on each unit record transaction since the last statement rendering: date, merchant/ATM name and location, type of transaction, dollar amount and reference number. The terminal identifier code associated with each transaction serves as a reference to the appropriate directory of FIG. 3 or FIG. 6 to enable name and location information to be recorded on the statement. This unit record information is printed serially on the statement in a format convenient for understanding and recordkeeping purposes. After completion of statement printing, the cancelled conventional checks processed by the customer's financial institution are merged with the statement and mailed to the customer. Upon receipt of this statement and cancelled checks, the customer can merge his concelled unit records and the conventional cancelled checks and verify the statement's accuracy.

Retrieval of a Copy of a Unit Record Transaction

In the event that a customer or authorized institution requests a copy of a completed unit record transaction, the following procedure may be applied. The customer formally requests a copy of a specific unit record transaction from his own financial institution through mention of the reference number associated with the transaction in question. The customer may obtain this reference number from his monthly checking account statement which itemizes each unit record transaction with some descriptive information in addition to a reference number.

The customer's financial institution accesses its data base, through use of the respective reference number, and retrieves the following characteristics of the transaction: date and time of transaction, terminal location and terminal I.D. (ATM or POS) servicing financial institution. The financial institution that services terminal where the transaction occurred is supplied with this information and the reference number as part of a formal request for copy of the unit record transaction. The terminal servicing financial institution locates the appropriate microfilm cassette through this date/time and terminal location information, extracts a copy of the appropriate transaction and verifies that is the unit record being sought through comparison of the reference number supplied by the customer and that shown on the copy image. The correct copy is then forwarded via the customer's financial institution to the customer.

Although various forms and modifications of systems and methods in accordance with the invention have been described it will be appreciated that the invention is not limited thereto but encompasses all variations falling within the scope of the appended claims.

What is claimed is:

1. The method of effecting a financial transaction involving a financial institution and a customer of the institution comprising the steps of:
    making entries on a unit record detailing a portion of the transaction, the entries being made by the customer;
    transmitting the unit record information to the financial institution; effecting automatic funds transfer at the financial institution from the transmitted unit record information; and
    recording summary information as to the transaction on the unit record under control of the financial institution whereby electronic funds transfer is effected without rehandling of the unit record and the customer retains the unit record as evidence both of his intention and the actual completion of the transaction.

2. The method set forth in claim 1 above including the further step of producing a retrievable image of the unit record and summary information recorded thereon.

3. The method set forth in claim 1 above including the further steps of transmitting, under customer control, supplementary customer transaction data to the financial institution, generating an authorization message at the financial institution, and recording at least a part of the authorization message on the unit record to uniquely identify the transaction.

4. The method set forth in claim 3 above, wherein the unit record includes machine readable information, and including the further steps of transmitting customer entered indentification data and machine readable data to the financial institution.

5. The method set forth in claim 4 above, including the further step of invalidating the unit record by imprinting a machine readable code thereon.

6. The method set forth in claim 5 above, wherein the machine readable information includes a code uniquely identifying the unit record as suitable for use in electronic funds transfer.

7. The method as set forth in claim 4 above, further including the step of invalidating the unit record by imprinting a predetermined machine readable pattern in the region of the code uniquely identifying the unit record as suitable for use in electronic funds transfer.

8. The method as set forth in claim 1 above, wherein the transaction is of the type including account credits, account debits, transfers between accounts, and reversal of a prior transaction.

9. The method set forth in claim 1 above, wherein the transaction involves two financial institutions, one of which has a terminal for transmission of unit record information, and further comprising the step of effecting automatic funds transfer between the two financial institutions.

10. The method set forth in claim 9 above, wherein the customer's financial institution is remote from the institution having the terminal and further comprising the step of entering teller-assisted unit record information.

11. The method set forth in claim 9 above, further comprising the step of entering, under customer control, data pertaining to the transaction.

12. The method set forth in claim 1 above, including the further step of providing a record for a merchant involved in the transaction with the financial institution and the customer.

13. The method set forth in claim 12 above in which the record for the merchant further includes information identifying the source of the funds used in the transaction.

14. The method as set forth in claim 13 above in which the identification of the source of the funds categorizes the transaction as a credit or debit transaction bearing different service charges for the merchant.

15. The method of effecting an automatic funds transfer transaction between a customer and an institution while providing protection for the parties thereto against fraud and error, comprising the steps of:
    filling out, by the customer, of a portion of a unit record containing machine readable information including customer account information;
    entering information detailing the financial aspects of the transaction;
    transmitting a message to the institution containing the customer account and transaction related information;
    verifying customer identification by the institution using at least the customer account and transaction related information;
    executing the requested funds transfer, including adjustment of the customer's account, immediately, whereby the recipient of the transfer is assured of its validity;
    transmitting data to the customer indicating that the transaction was satisfactorily completed; and
    recording at least part of the returned data on the unit record to evidence the manner in which the transaction was effected and convert the unit record to a further unusable document.

16. The method set forth in claim 15 above, further including the steps of entering, under customer control a personal identification number, transmitting the personal identification number to the institution, and verifying the proper relationship at the institution between the personal identification number and the account number.

17. The method set forth in claim 16 above, including in addition generating, at the institution, a reference number uniquely identifying the transaction, and imprinting, during recordation, the reference number on the unit record such that an audit trail for the transaction is established.

18. The method set forth in claim 17 above, including the steps of generating, at the institution, upon verification of the transaction, an authorization number which identifies at least the participants and the transaction and storing the authorization number electronically for possible reference.

19. The method of effecting a financial transaction involving a financial institution, a customer of the institution, an input terminal and a unit record having machine readable information thereon comprising the steps of:
  entering, by the customer, information on the unit record as to a part of the transaction;
  entering, under customer control at least financial data via the input terminal;
  machine reading of information on the unit record at the input terminal;
  transmitting the customer controlled data entry and machine read information to the financial institution;
  verifying the transaction and execution of the transaction at the financial institution;
  transmitting an authorization message to the terminal from the financial institution; and
  recording at least a portion of the authorization message on the unit record to evidence authorization and completion of the transaction.

20. The method as set forth in claim 19 above, further including the step of recording data for the customer as to the nature of the completed transaction.

21. The method as set forth in claim 20 above, wherein the recording of data is on the unit record itself.

22. The method as set forth in claim 21 above, wherein the recorded data comprises data as to transaction type, date and amount as executed by the financial institution, whereby the customer has an immediate and permanent record which can be used to verify the transaction.

23. The method as set forth in claim 19 above, wherein the input terminal includes means for entering personal identification data and the method further includes the steps of:
  assembling a transaction message at the terminal including machine read account and financial institution information, customer entered transaction type and amount information and personal identification information;
  verifying at the financial institution the validity of the transaction from the transmitted transaction message; and
  including in the authorization message, information uniquely identifying the particular transaction.

24. The method as set forth in claim 19 above, wherein the unit record comprises entries permitting use as a negotiable instrument, and wherein the method further comprises the step of invalidating the document by imprinting a predetermined readable pattern thereon.

25. The method as set forth in claim 19 above, including the step of recording on the unit record information verifiable by the customer as to the details of the transaction that was completed.

26. The method as set forth in claim 19 above, including the steps of entering, by the customer, personal code information, verifying the authorization of the customer by the financial institution using both machine read and customer entered information, and incorporating, in the authorization message, a reference code uniquely identifying the transaction.

27. The method as set forth in claim 26 above, wherein the unit record machine readable information includes encoded financial institution information and identifier code information characterizing the record as suitable for use in the method, and further comprising the step of verifying the identifier code information prior to transmission of any information to the financial institution.

28. The method as set forth in claim 27 above, including the further steps of imprinting an invalidating code evidencing a void or cancelled record, and rejecting the record if it contains the invalidating code.

29. The method of evidencing and completing an automatic funds transfer transaction between a customer and a financial institution, based upon usage of an independently negotiable instrument including machine readable fields, customer entry fields and imprinting fields, the method including the use of at least one customer terminal, at least one financial institution processor, and data links therebetween, and comprising the steps of:
  preparing, by the customer, customer entry fields on the instrument to initiate the transaction;
  assembling a transaction message at the terminal including machine reading of the instrument and customer entry of transaction information;
  transmitting the transaction message to the financial institution processor;
  returning an authorization message from the processor to the terminal evidencing execution of the funds transfer; and
  post-printing instrument invalidating and transaction record information on the instrument to complete the transaction, whereby the instrument is initially available for use as a negotiable document but serves as a complete customer record when used for automatic funds transfer.

30. The method as set forth in claim 29 above, wherein the step of post-printing comprises converting the instrument to a non-negotiable instrument.

31. The method as set forth in claim 29 above, wherein the instrument includes encoded machine readable account and financial institution information and the terminal includes keyboard means and means for reading the encoded information, and further comprising the steps of entering transaction data and security information by the customer on the keyboard means, entering account and financial institution information by machine, and entering security code information by the customer on the keyboard means.

32. The method as set forth in claim 31 above, wherein the terminal is associated with a merchant institution and the merchant and customer financial institutions are different, and further including the steps of:
  transmitting funds transfer information between the different financial institutions; and accumulating transaction information at the terminal for the merchant.

33. The method as set forth in claim 31 above, wherein the terminal includes copying means, and including the further step of copying the completed instrument subsequent to post printing thereon.

34. The method as set forth in claim 33 above, including the further step of interposing a reference pattern on the copy of the completed instrument to identify the transaction.

35. In a system for automatic funds transfer including a terminal having key entry and code reader devices and a data processor at an institution, the method comprising the steps of:
   accessing the system with a document evidencing customer intent and bearing machine readable data;
   converting the intent evidenced on the document to a fully authorized transfer utilizing key entered information;
   verifying the propriety of the authorized transfer at the institution;
   effecting the intended transfer at the institution; and
   rendering the document non-negotiable by control from the institution.

36. The method as set forth in claim 35 above, wherein the step of effecting the transfer is carried out in a secure environment not accessible to the customer.

37. The method as set forth in claim 36 above, wherein the document is adapted for alternative use as a traditional bank check.

38. A method for effecting multiple types of financial transactions with limited document handling using a data processor system comprising the steps of:
   generating originating check documents by individual customers, each check document evidencing a part of a different transaction;
   using the check documents and manually entered information in consummating electronic funds transfer for each transaction;
   completing the check documents to evidence consummated funds transfer;
   generating retrievable copies of each completed document;
   electronically retaining transaction data, including reference to the retrievable copies, within the data processing system; and
   immediately returning the originating check documents to the customers, whereby the customer has a verifying document and the transaction is thereafter handled by the data processor system, while a reference audit trail is also established.

39. The method as set forth in claim 38 above, wherein different terminals each communicating with the data processor system are disposed to effect the transactions, and wherein the method further comprises the steps of generating retrievable copies at each terminal to evidence transactions thereat.

40. The method as set forth in claim 39 above, further including the step of concurrently generating summary data for merchants affected by the transactions.

41. An integrated transaction system for debits or credits comprising:
   a transaction instrument in the form of a negotiable instrument having coded customer account indicia and customer entered transaction indicia;
   transaction terminal means including means for sensing account indicia on the instrument, controllable means for imprinting on the instrument, customer data entry means, and display means;
   processor means coupled to control the transaction terminal means for sequencing the terminal means to derive the coded customer account indicia from the instrument and the customer entered transaction indicia, including a personal identification number;
   an electronic funds transfer system coupled to the processor means for receiving the coded customer account indicia, the transaction indicia and the personal identification number, and providing authorization and transaction information where the transaction is permissible, while entering the transaction in the system; and
   the processor means and terminal means responding to the authorization and transaction information to print the same on the instrument, whereby the customer has a complete and immediate record of the transaction in the form of a non-negotiable instrument with security against unauthorized access to his account.

42. The invention as set forth in claim 41 above, wherein the instrument is of the type traditionally negotiable in exchange for goods or services, and wherein said electronic funds transfer system provides post transaction balance information to the terminal means for the customer.

43. The invention as set forth in claim 41 above, wherein said electronic funds transfer system includes means providing access to both the accounts of the customer and a merchant firm with which the customer is dealing, and further including means for electronic transfer of funds between the customer's financial institution and the merchant's financial institution where they are different.

44. The invention as set forth in claim 43 above, where the terminal means comprises an automated teller machine, and wherein the electronic funds transfer system comprises a central processor for a financial institution.

45. The invention as set forth in claim 44 above, wherein the system includes in addition a cash dispensing mechanism and means at the electronic funds transfer system responsive to the coded customer account indicia and the personal identification number for actuating the cash dispensing mechanism to provide a selected money amount.

46. The invention as set forth in claim 43 above, wherein said terminal means comprises a point-of-sale terminal in a merchant institution, and wherein said electronic funds transfer system comprises means communicating both with the customer's financial institution and the merchant's financial institution, if different.

47. The invention as set forth in claim 43 above, wherein the terminal means further comprises controllable means for producing a retrievable image of the instrument, and said terminal means commands the controllable means to produce a retrievable image of the instrument after printing of information on the instrument.

48. The invention as set forth in claim 47 above, wherein said controllable means comprises a microfilm camera and a film cassette mechanism, and means responsive to the processor means for coding a unique code for each transaction.

49. The invention as set forth in claim 48 above, wherein the processor means provides a unique code for each transaction in the form of a code identifying the particular terminal and the time of the transaction.

50. The invention as set forth in claim 49 above, wherein said terminal means comprises keyboard means, keyboard display means, and transaction selector means.

51. The invention as set forth in claim 50 above, wherein said means for sensing account indicia on the instrument comprises code reader means of the optical character or magnetic ink character recognition type.

52. The invention as set forth in claim 51 above, wherein said display means comprises status command indicator means and video display means coupled to said processor means.

53. The invention as set forth in claim 52 above, wherein the instrument includes a machine readable identifier code identifying it as suitable for electronic funds transfer, and wherein the terminal means includes code reader means for such code.

54. The invention as set forth in claim 53 above, wherein the means for imprinting includes means for imprinting a machine readable invalidation code on the instrument.

55. The invention as set forth in claim 54 above, wherein the terminal further includes a receiver mechanism for the instrument, means for ejecting the instrument from the receiver mechanism, and means for signaling that the instrument has been ejected.

56. A system for enabling electronic funds transfer utilizing a conventionally negotiable instrument such as a check having a machine readable account code and comprising:
processor controlled terminal means including means for reading the account code on the instrument and means for customer entry of transaction data and a personal identification;
electronic funds transfer means including means (1) responsive to the account code and personal identification for authorizing a transaction (2) responsive to the transaction data for effecting electronic funds transfer and (3) for generating unit record identification; and
means coupled to said processor controlled terminal means and responsive to the electronic funds transfer means for imprinting unit record information on the check, whereby the customer may obtain a record evidencing a completed secure transaction or use the check in conventional fashion.

57. The invention as set forth in claim 56 above, wherein the processor controlled terminal means comprises a plurality of terminals coupled to cooperate with an individual processor, and wherein each terminal includes means for reading account codes and means for customer entry.

58. The invention as set forth in claim 57 above, wherein each terminal further comprises printer means, and means for producing a retrievable image of the check after printing thereon.

59. The invention as set forth in claim 58 above, wherein each terminal means further comprises display means coupled to the processor output, and keyboard means coupled to the processor input, and wherein the processor generates customer instruction sequences of the display for keyboard entry of transaction information and personal identification number by the customer.

60. The invention as set forth in claim 59 above, wherein said processor generates a code for each transaction, and wherein said terminals each include camera means including code generating means responsive to the transaction codes for filming the imprinted checks.

61. The invention as set forth in claim 60 above, wherein the transaction codes comprise terminal identification, date and time information.

62. A system for automatically processing checks presented by the payor of the check comprising a central computer capable of recording financial transactions; a remote data processing terminal capable of recognizing information on a check indicating the identity of the payor, the terminal comprising means for generating signals indicative of the identity of the payor, the amount to be paid, the account to be paid, and the identity of the remote terminal, the remote terminal also comprising means for printing on the check a record of the transaction, and means for storing a duplicate record of the transaction; and means for relaying signals between the remote terminal and the central computer.

63. A system as claimed in claim 62 wherein the remote data processing terminal further comprises means for generating a security identification signal, and wherein the central computer comprises means for recognizing security identification signals and generating an authorizing signal in response to such recognition.

64. A system as claimed in claim 63 wherein the means for generating a security identification signal are physically separated from the remainder of the remote data processing terminal.

65. A system as claimed in claim 62 in which the means for storing a duplicate record comprises means for providing a retrievable copy of the check.

66. A system as claimed in claim 62 in which the remote terminal further comprises means for displaying information indicative of the transaction being processed.

67. A system as claimed in claim 62 in which the central computer includes means for generating signals indicative of account balances for transmission to the remote terminal.

68. A system as claimed in claim 62 wherein the central computer further comprises means for producing records of all of the accounts of a payor in response to the receipt of signals indicative of the identity of the payor.

69. A system as claimed in claim 62 in which the remote terminal further comprises means for displaying information to direct the processing of the transaction being processed.

70. A system as claimed in claim 62 wherein the remote terminal further comprises means for generating signals indicating different ones of a plurality of financial transactions to be accomplished.

71. A remote data processing terminal to be used with the central computer of a financial institution comprising means for reading account identification information from a financial institution check and for generating signals indicative thereof, means for generating signals indicative of transaction data related to the financial institution check, means for displaying information as to the transaction, and means responsive to the central computer and the transaction data for recording information on the financial institution check that converts the check to a non-negotiable record for return to the customer.

72. A remote data processing terminal as claimed in claim 71 further comprising means for generating security identification signals for comparison with signals stored by the central computer, means coupled to said means for recording for supplying a reference number to be recorded on the check, and means for retaining an image of the check on which the reference number appears.

73. A unit record for use as a negotiable instrument or alternatively as a document for initiating electronic funds transfer and recordation thereof, comprising:
- a machine readable code field identifying at least an account number and financial institution and including a field for entry of voiding data;
- manually enterable fields for receiving at least transaction and account holder data; and
- imprintable fields comprising at least amount and confirmation data evidencing completion of the transaction.

74. A unit record as set forth in claim 73 above, wherein the record further comprises a second machine readable code field containing data uniquely identifying the unit record as a document suitable for the electronic funds transfer process, the field for entry of voiding data being contained therein.

75. A unit record as set forth in claim 74 above, wherein the manually enterable fields further comprise a data entry field and wherein the unit record further includes preprinted fields comprising account holder and financial institution information.

76. A unit record as set forth in claim 75 above, wherein the imprintable fields comprise portions for receiving authorization message data comprising a reference number from the financial institution.

77. A unit record as set forth in claim 76 above, wherein the unit record further comprises a visual identifier field for uniquely identifying the record as a document suitable for the electronics funds transfer process.

78. A unit record as set forth in claim 77 above, wherein the unit record comprises a negotiable instrument and the manually entered fields comprise payee, date and signature.

79. A unit record as set forth in claim 78 above, wherein the imprintable fields further comprise date and time information.

80. A unit record as set forth in claim 79 above, wherein the imprintable fields include at least a portion for cancelling the negotiable instrument.

81. A unit record as set forth in claim 82 above, wherein the imprintable fields include in addition a field for imprinting the then current financial status of the customer's account.

82. A unit record as set forth in claim 83 above, wherein the imprintable fields include in addition a field for imprinting information identifying the merchant and terminal or seller, a field for identifying the debit or credit status of the transaction.

* * * * *